United States Patent [19]

Altman et al.

[11] Patent Number: 4,752,433
[45] Date of Patent: Jun. 21, 1988

[54] VENT SYSTEM FOR DISPLACER ROD DRIVE MECHANISM OF PRESSURIZED WATER REACTOR AND METHOD OF OPERATION

[75] Inventors: Denis J. Altman, Penn Township, Westmoreland County; Steven J. Lovasic, Washington Township, Fayette County; John V. Miller, Munhall; Allen L. Morris, Shaler Township, Allegheny County; Eric D. Rinker, Penn Borough; Terry L. Schulz, Murrysville; Donald G. Sherwood, Monroeville; William R. Snyder, Penn Township, Westmoreland County, all of Pa.

[73] Assignee: Westinghouse Electric Corp., Pittsburgh, Pa.

[21] Appl. No.: 806,719

[22] Filed: Dec. 9, 1985

[51] Int. Cl.[4] ............................................. G21C 7/16
[52] U.S. Cl. .................................... 376/230; 376/258
[58] Field of Search ............... 376/230, 231, 240, 258, 376/260

[56] References Cited

U.S. PATENT DOCUMENTS

| | | | |
|---|---|---|---|
| 3,855,059 | 12/1974 | Groves et al. | 376/230 |
| 3,957,577 | 5/1976 | Treshow | 376/230 |
| 3,989,589 | 11/1976 | Frisch | 376/230 |
| 4,030,972 | 6/1977 | Groves | 376/230 |
| 4,439,054 | 3/1984 | Veronesi | 376/230 |
| 4,550,941 | 11/1985 | Veronesi et al. | 376/230 |

Primary Examiner—Deborah L. Kyle
Assistant Examiner—Daniel Wasil
Attorney, Agent, or Firm—D. C. Abeles

[57] ABSTRACT

A vent system for controlling hydraulically actuated drive means for selectively moving pluralities of rod clusters respectively connected to the plurality of drive means between fully inserted positions within the lower barrel assembly of the vessel in telescoping relationship with fuel rod assemblies contained therein, and a fully withdrawn position. Each drive means responds to the reactor coolant fluid pressure and includes a leakage passage and an outlet channel through which a leakage flow may pass under control of the vent system, the latter comprising a valve arrangement, flow restrictors and a common orifice through which the outlet channels are selectively connected to essentially ambient pressure, for establishing a pressure differential within each drive means producing a net force for moving the drive rods and associated clusters to the withdrawn position at which the drive means mechanically latch the fully withdrawn clusters for mechanically supporting same in the fully withdrawn position. The valve arrangement may be selectively actuated to reestablish the pressure differential within each drive means thereby to raise the associated drive rods and release same from the mechanically latched positions, after which the valve arrangement is selectively operated to establish pressure equilibrium within the drive means to permit the corresponding drive rods and associated control rod clusters to fall by force of gravity to the fully inserted positions thereof. Display indications and control panel operation provide for operator sensing of the rod cluster positions and control of the valve arrangement.

28 Claims, 7 Drawing Sheets

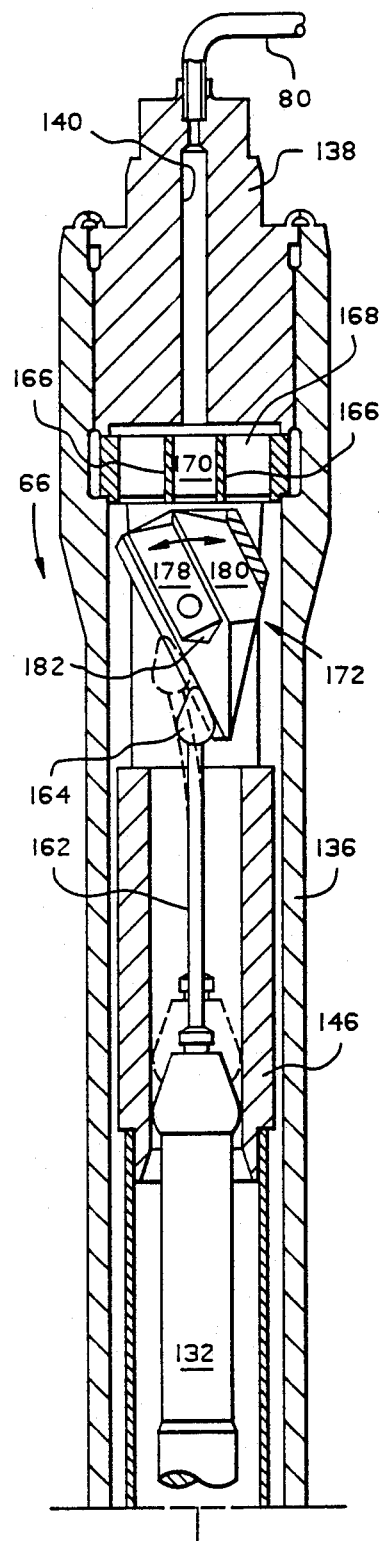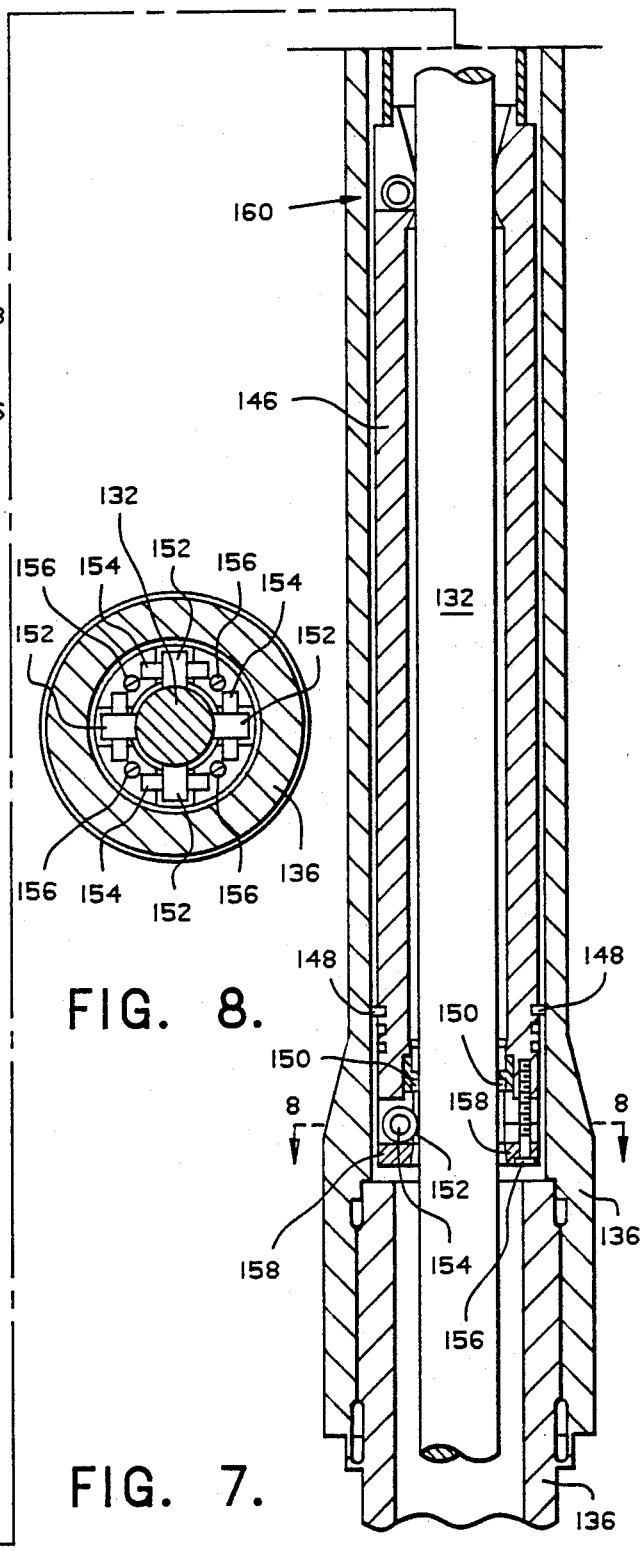
FIG. 8.
FIG. 7.

POSITION 1 - FULLY INSERTED
POSITION 2 - PARTIALLY WITHDRAWN
POSITION 3 - FULLY WITHDRAWN (UNLATCHED)
POSITION 4 - FULLY WITHDRAWN & PARKED

VENT SYSTEM FOR DISPLACER ROD DRIVE MECHANISM OF PRESSURIZED WATER REACTOR AND METHOD OF OPERATION

BACKGROUND OF THE INVENTION

1. Field of the Invention

This invention relates to pressurized water reactor systems and, more particularly, to a vent system and method of operation for controlling and actuating hydraulically operated displacer rod drive mechanisms for selective positioning of water displacer rods in the reactor vessel.

2. State of the Relevant Art

As is well known in the art, conventional pressurized water reactors employ a number of control rods which are mounted within the reactor vessel, generally in parallel axial relationship, for axial translational movement in telescoping relationship with the fuel rod assemblies. The control rods contain materials known as poisons, which absorb neutrons and thereby lower the neutron flux level within the core. Adjusting the positions of the control rods relative to the respectively associated fuel rod assemblies thereby controls and regulates the reactivity and correspondingly the power output level of the reactor.

Typically, the control rods, or rodlets, are arranged in clusters, and the rods of each cluster are mounted to a common, respectively associated spider. Each spider, in turn, is connected to a respectively associated adjustment mechanism for raising or lowering the associated rod cluster.

In certain advanced designs of such pressurized water reactors, there are employed both reactor control rod clusters (RCC) and water displacer rod clusters (WDRC). In one such reactor design, a total of over 2800 reactor control rods and water displacer rods are arranged in 185 clusters, each of the rod clusters being mounted to a respectively corresponding spider. In the exemplary such advanced design pressurized water reactor, there are provided, at successsively higher, axially aligned elevations within the reactor pressure vessel, a lower barrel assembly, an inner barrel assembly, and a calandria, each of generally cylindrical configuration, and an upper closure dome, or head. The lower barrel assembly may be conventional, having mounted therein, in parallel axial relationship, a plurality of fuel rod assemblies which are supported at the lower and upper ends thereof, respectively, by corresponding lower and upper core plates. Within the inner barrel assembly there is provided a large number of rod guides disposed in closely spaced relationship, in an array extending substantially throughout the cross-sectional area of the inner barrel assembly. The rod guides are of first and second types, respectively housing therewithin reactor control rod clusters (RCC) and water displacer rod clusters (WDRC); these clusters, as received in telescoping relationship within their respectively associated guides, generally are aligned with respectively associated fuel rod assemblies.

One of the main objectives of the advanced design, pressurized water reactors to which the present invention is directed, is to achieve a significant improvement in the fuel utilization efficiency, resulting in lower, overall fuel costs. Consistent with this objective, the water displacement rodlet clusters (WDRC's) function as a mechanical moderator control, all of the WDRC's being fully inserted into association with the fuel rod assemblies, and thus into the reactor core, when initiating a new fuel cycle. Typically, a fuel cycle is of approximately 18 months, following which the fuel must be replaced. As the excess reactivity level diminishes over the cycle, the WDRC's are progressively, in groups, withdrawn from the core so as to enable the reactor to maintain the same reactivity level, even though the reactivity level of the fuel rod assemblies is reducing due to dissipation over time. Conversely, the control rod clusters are moved, again in axial translation and thus telescoping relationship relatively to the respectively associated fuel rod assemblies, for control of the reactivity and correspondingly the power output level of the reactor on a continuing basis, for example in response to load demands, in a manner analogous to conventional reactor control operations.

The calandria includes a lower calandria plate and an upper calandria plate. The rod guides are secured in position at the lower and upper ends thereof, respectively, to the upper core plate and the lower calandria plate. Within the calandria and extending between the lower and upper plates thereof is mounted a plurality of calandria tubes in parallel axial relationship, respectively aligned with the rod guides. Flow holes are provided in remaining portions of the calandria plates, intermediate the calandria tubes, through which passes the reactor core outlet flow as it exits from its upward passage through the inner barrel assembly. The core outlet flow, or a major portion thereof, turns from the axial flow direction to a radial direction for passage through radially outwardly oriented outlet nozzles which are in fluid communication with the calandria.

In similar, parallel axial and aligned relationship, the calandria tubes are joined to corresponding flow shrouds which extend to a predetermined elevation within the head, and which in turn are connected to corresponding head extensions which pass through the structural wall of the head and carry, on their free ends at the exterior of and vertically above the head, corresponding adjustment mechanisms, as above noted. The adjustment mechanisms have corresponding control shafts, or drive rods, which extend through the respective head extensions, flow shrouds, and calandria tubes and are connected to the respectively associated spiders mounting the clusters of RCC rods and WDRC rods, and serve to adjust their elevational positions within the inner barrel assembly and, correspondingly, the level to which the rods are lowered into the lower barrel assembly and thus into association with the fuel rod assemblies therein, thereby to control the activity within the core.

In the exemplary, advanced design pressurized water reactor, over 2,800 rods are mounted in 185 clusters, the latter being received within corresponding 185 rod guides. Of these clusters, 88 are of the WDRC type, divided into 22 groups of four clusters each, the clusters of each group being chosen such that withdrawal of an individual group, or multiple such groups, maintains a symmetrical power distribution within the reactor core. Since each WDRC is approximately 700 lbs. to 800 lbs. in weight, each group of four (4) such clusters presents a combined weight of in the range of from 2,800 lbs. to 3,200 lbs., requiring that a drive mechanism and associated connecting structure for each group of four clusters have substantial strength and durability, and afford a substantial driving force.

Due to the packing density, or close spacing, of the rod clusters and their associated guides, severe spacing requirements are imposed, both within the vessel and with respect to the rod drive mechanisms, including both the water displacer rod drive mechanisms (DRDM's) and the control rod drive mechanism (CRDM's). The critical spacing requirements were not experienced in reactors of prior, conventional types, which did not employ WDRC's and correspondingly did not employ DRDM's. In reactors of such conventional designs, ample spacing was available above the dome, or head, of the vessel for accommodating the required number of mechanisms for driving the RCC's. Particularly, the CRDM's of well known, electromechanical type associated with corresponding clusters of RCC's, were mounted in generally parallel axial relationship, vertically above the dome or head of the vessel and extended in sealed relationship through the head for connection by suitable drive rods to the associated RCC's, and provided for selectively controlled gradual raising and lowering of the RCC's for moderating the reactor energy level, or for rapidly lowering same in the case of shutdown requirements.

In reactor systems of the advanced design herein contemplated, whereas the same mechanisms conventionally employed for the CRDM's functionally are acceptable for adjusting the WDRC's, due to the increased number of rod clusters (i.e., the total of RCC's and WDRC's), the conventional CRDM's are unacceptable mechanically, since they are too large. Various alternative mechanisms have been studied in view of this problem. For example, roller nut-drives were considered, but were determined to produce insufficient lifting force.

Accordingly, a substitute DRDM has been developed which utilizes a hydraulically operated piston which is attached through a corresponding drive rod to each group of associated WDRC's, and which mechanism satisfies the spacing limitations, permitting mounting thereof above the head or dome of the vessel in conjunction with the conventional CRDM's. An example of such a hydraulically operated drive mechanism for a WDRC is shown in U.S. Pat. No. 4,439,054—Veronesi, issued Mar. 27, 1984 and assigned to the common assignee hereof.

The provision of the hydraulically operated mechanism suitable for use with WDRC's as hereinabove set forth, however, has imposed a design requirement of a system to control and manipulate the hydraulic mechanism. No known systems are available for this purpose, in view of the fact that the requirement therefor has arisen out of the evolving design of the advanced design, pressurized water reactors of the type herein contemplated.

SUMMARY OF THE INVENTION

As before noted, a pressurized water nuclear reactor, of the advanced design type with which the vent system of the present invention is intended for use, employs a large number of reactor control rods, or rodlets, typically arranged in what are termed reactor control rod clusters (RCC) and, additionally, a large number of water displacer rods, or rodlets, similarly arranged in water displacer rod clusters (WDRC), an array of 185 such clusters containing a total of 2800 rodlets (i.e., the total of reactor control rods and water displacer rods) being mounted in parallel axial relationship within the inner barrel assembly of the reactor pressure vessel. The rods of each cluster are mounted at their upper ends to a corresponding spider, and the spider-mounted cluster is received in telescoping relationship within a corresponding rod guide. Each spider is connected through a drive rod to a corresponding adjustment mechanism, which provides for selectively raising or lowering the rod cluster relatively to an associated group of fuel rod assemblies.

The adjustment mechanisms more specifically are mounted in generally parallel axial relationship on the head, or dome, of the pressure vessel. The control rod cluster drive mechanism (CRDM's) may be of conventional type as employed in the prior art, comprising electromechanically actuated mechanisms which provide for selectively raising and lowering the RCC's to provide the desired level of reactivity within the core and, alternatively, to lower the control rods rapidly in the event of a requirement for rapid shutdown. The drive mechanisms (DRDM's) for the water displacer rod clusters (WDRC's) may be of the type shown in the above referenced U.S. Pat. No. 4,439,054, which are driven hydraulically, and include a latch mechanism which mechanically latches at a fixed position adjacent the upper end of the stroke. The hydraulic mechanisms of the patented type are compatible in physical size with the CRDM's, and thus may be accommodated within the available spacings on the head, or dome, of the vessel.

Each spider, and thus its associated vane assemblies, must be of considerable structural strength and weight. A typical water displacer rod (WDRC) cluster may comprise up to 24 water displacer rods mounted in alternating groups of two and four rods on corresponding ones of a total of eight vane assemblies, each of the four-rod assemblies including both a radially extending vane element and a pair of transversely extending vane elements, the latter carrying the cylindrical support mounts at their outer extremeties. As before noted, the total weight of a water displacer rod cluster, thus configured, is approximately 700 lbs. to 800 lbs. The spiders must support not only the dead weight of the respective rod clusters, but additionally must accommodate the forces imposed thereon both by the environment of the relatively fast-moving core outlet flow which passes thereover and the rod height adjustment functions.

The total of eighty-eight (88) WDRC's, in the exemplary vessel, are divided into 22 groups of four clusters each, the WDRC's of each group being selected such that withdrawal of a given one or more of the WDRC groups maintains a symmetrical power distribution within the reactor core. It follows that the total weight of a WDRC group is substantial, ranging from 2,800 lbs. to 3,200 lbs., and that a correspondingly high level force must be developed for raising the WDRC groups, as required, at successive stages of the fuel cycle.

The vent system for the displacer rod drive mechanisms (DRDM's) of a pressurized water reactor in accordance with the present invention comprises an arrangement of valves, flow restricting devices, and a common orifice, for hydraulically actuating the DRDM's to drive the WDRC's between either the fully inserted or fully withdrawn positions, relative to the fuel assemblies. The pressure differential between the reactor vessel and the reactor coolant drain tank, which acts on the DRDM's, is used to achieve this function. The common orifice regulates the flow level, as may be required when two or more WDRC groups are selected for simultaneous withdrawal operations. The common orifice, in conjunction with the individual flow restricting devices, thus limit the rate of travel of the WDRC's to a safe value. The vent system is selectively operable in three modes, or flow conditions, including (I) normal withdrawal, (II) normal insertion, and (III) withdrawal employing a bypass line. By selective operation of the valve arrangement and through use of the flow restricting devices in condition (I), the pressure within the vessel head produces a pressure differential within the selected hydraulic mechanisms for withdrawing the corresponding WDRC's. When the WDRC's are fully withdrawn, the corresponding valves are closed and the pressure differential across the hydraulic mechanisms dissipates, due to a designed rate of leakage past the piston rings therein. Once pressure equilibrium is established, the WDRC's drop, or descend, by force of gravity, automatically engaging the mechanical latches within the DRDM's which then lock the WDRC's in their withdrawn, parked positions. Insertion of one or more WDRC groups into the core from a fully withdrawn and locked position is achieved by initially establishing the valve actuation of condition (I) for the withdrawal operation for a limited interval, sufficent to permit the hydraulic mechanisms to advance upwardly and release the mechanical latches, following which, condition (II) is initiated, in which a further valve is opened to communicate pressure from a head vent of the vessel to the respective hydraulic mechanisms (DRDM's) of the selected group or groups, thereby equalizing the pressure across the corresponding pistons and allowing the WDRC's of each group to descend, or fall, into the core under the force of gravity. The withdrawal using bypass, of condition (III) of the vent system, accommodates certain abnormal operating conditions, such as when a drive rod is stuck or a set of high leakage piston rings fails to seat properly, which in turn may prevent one or more WDRC clusters from being withdrawn under the normal withdrawal procedure of condition (I). The bypass mode serves to bypass the previously noted, common orifice, thereby increasing the pressure drop across the DRDM piston rings by several hundred pounds per square inch (psi), the increased pressure differential thus imposed being sufficient to seat any malfunctioning piston ring and raise the WDRC group to the desired, fully withdrawn position. This operation concludes, as in the normal withdrawal step, with closing of the associated valves, permitting the WDRC's to settle into the parked position, engaged by the mechanical latch of the DRDM's. Additionally, the vent system of the invention provides a recovery procedure for correcting any missequencing of the drive operations which may occur either due to unexpected impediments, as above described, or as may arise from inadvertent, premature actuation of the valves causing one or more of the individual DRDM's of a given group to be latched in the parked, fully withdrawn position, while others remain in an intermediate position, neither fully withdrawn nor fully inserted.

Accordingly, the vent system of the present invention provides efficient and effective operation, utilizing the available hydraulic driving force of the high pressure within the reactor vessel, while employing a minimum number of selectively actuated conventional valves and flow restricting devices in combination with the noted, hydraulically actuated DRDM's, to afford a system which is safe and versatile in operation, yet low in cost of components and operation. These and other advantages of the present invention will become more apparent from the following detailed drawings and associated discussion.

BRIEF DESCRIPTION OF THE DRAWINGS

FIG. 7 is an elevational, cross-sectional view of a displacer rod drive mechanism (DRDM) suitable for use with the vent system of the present invention;

FIG. 8 is a cross-sectional view, taken along the line 8—8 in FIG. 7;

DETAILED DESCRIPTION OF THE PREFERRED EMBODIMENTS

Figure 1:
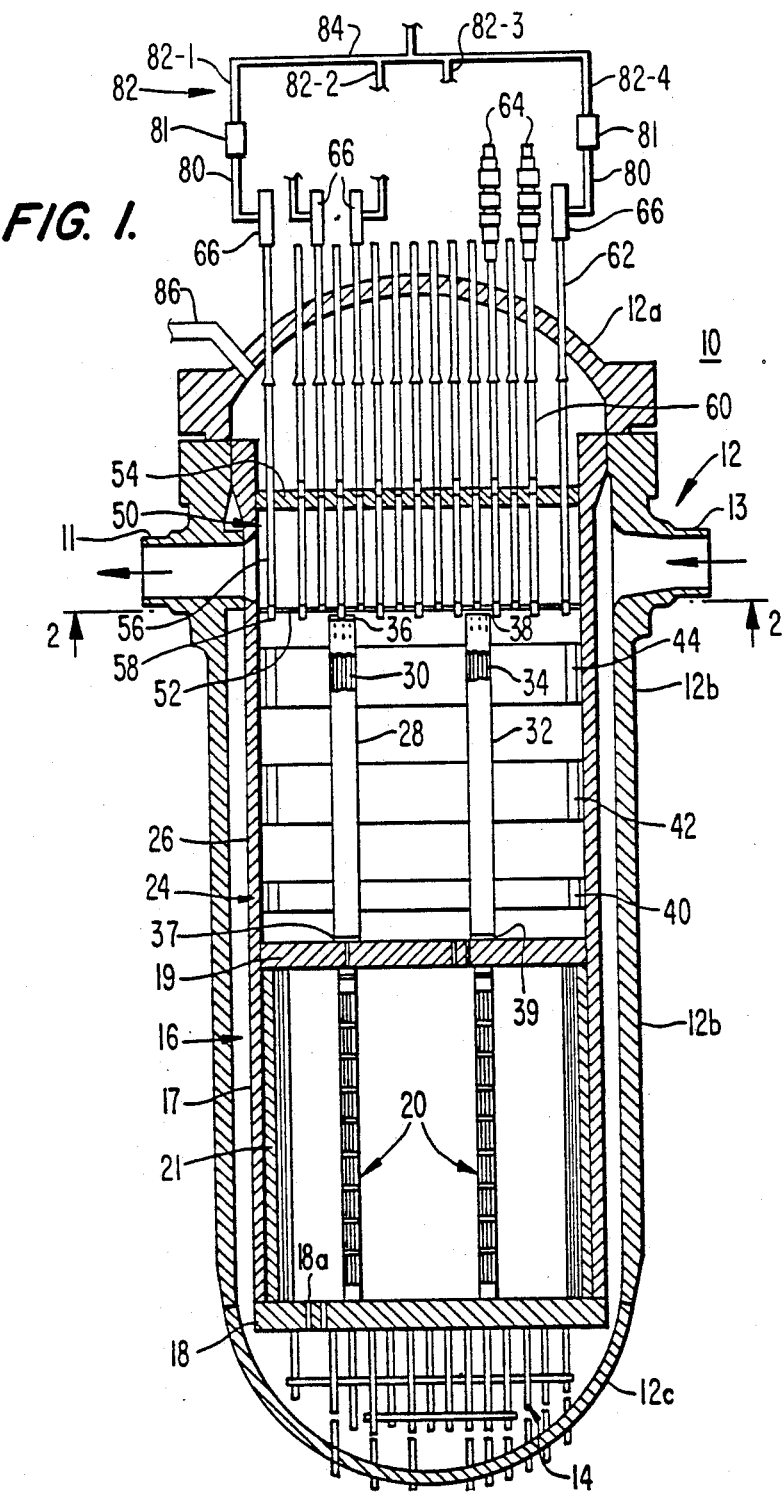
FIG. 1 is an elevational view, partially in cross-section, of a pressurized water reactor of the advanced design type with which the vent system for the displacer rod drive mechanisms in accordance with the present invention is intended to be employed.

FIG. 1 is an elevational view, partly in cross-section, of a pressurized water reactor 10 comprising a vessel 12 of generally conventional configuration including an upper dome, or head, 12a, cylindrical sidewalls 12b, and a bottom closure 12c comprising the base of the reactor 10. Within the bottom closure 12c, as schematically indicated, is so-called bottom-mounted intrumentation 14. The lower barrel assembly 16 comprises a generally cylindrical sidewall 17 affixed at its lower and upper ends to respective lower and upper core plates 18 and 19. Fuel rod assemblies 20 are positioned in generally vertically oriented, parallel axial relationship within the lower barrel assembly 16. A neutron reflector and shield 21 is mounted interiorly of the cylindrical sidewalls 17, in conventional fashion.

The inner barrel assembly 24 includes a cylindrical sidewall 26 within which is positioned a plurality of rod guides in closely spaced, parallel axial relationship; for simplicity of illustration, only two such rod guides are shown in FIG. 1, namely rod guide 28 housing a cluster of radiation control rods 30 (RCC) and a rod guide 32 housing a cluster of water displacement rods 34 (WDRC). Mounting means 36 and 37 are provided at the respective upper and lower ends of the rod guide 28 and, correspondingly, mounting means 38 and 39 are provided at the respective upper and lower ends of the rod guide 32, the lower end mounting means 37 and 39 mounting the respective rod guides 28 and 32 to the upper core plate 19, and the upper mounting means 36 and 38 mounting the respective rod guides 28 and 32 to a calandria assembly 50.

The calandria assembly 50 includes a lower calandria plate 52, an upper calandria plate 54, and a plurality of parallel axial calandria tubes 56 which are positioned in alignment with corresponding apertures in the lower and upper calandria plates 52 and 54 and to which the calandria tubes 56 are mounted at their respective, opposite ends. Calandria extensions 58 project downwardly from the calandria tubes 56 and connect to corresponding mounting means 36 for the upper ends, or tops, of the RCC rod guides 28. The upper end mounting means 38, associated with the WDRC rod guides 32, may be interconnected by flexible linkages to the mounting means 36 of the RCC rod guides 28, in accordance with the invention of the pending application, entitled: "FLEXIBLE ROD GUIDE SUPPORT STRUCTURE FOR INNER BARREL ASSEMBLY OF PRESSURIZED WATER REACTOR"—Gillett et al., assigned to the common assignee herewith. Alternatively, the WDRC rod guides 32 may be connected independently to the lower calandria plate 52 by the top end support structure of the invention disclosed in the copending application, entitled: "TOP END SUPPORT FOR WATER DISPLACEMENT ROD GUIDES OF PRESSURIZED WATER REACTOR"—Gillett et al., assigned to the common assignee hereof.

Extending upwardly beyond the upper calandria plate 54 and, more particularly, within the dome 12a of the vessel 12, there is provided a plurality of flow shrouds 60 respectively aligned with the calandria tubes 56. A corresponding plurality of head extensions 62 is aligned with the plurality of flow shrouds 60, with respective adjacent ends thereof in generally overlapping relationship. The head extensions 62 pass through the head or upper wall of the dome 12a and are sealed thereto. Control rod cluster (RCC) displacement mechanisms 64 and water displacement rod cluster (WDRC) displacement mechanisms 66 are associated with the respective head extensions 62, flow shrouds 60 and calandria tubes 56 which, in turn, are associated with respective clusters of radiation control rods 30 and water displacement rods 34. The RCC displacement mechanisms (CRDM's) 64 may be of well known type, as are and have been employed with conventional reactor vessels. It will be understood that the drive rods which are connected to the respective RCC clusters 30 extend from the top thereof through the corresponding mechanisms 64, projecting upwardly above same as the clusters are raised and progessing in telescoping fashion downwardly through the mechanisms 64 as the clusters 30 are lowered into association with the fuel assemblies 20. The displacer mechanisms (DRDM's) 66 for the water displacer rod clusters (WDRC's) 34, as employed with the vent system of the present invention, may be in accordance with the disclosure of U.S. Pat. No. 4,439,054—Veronesi, as before noted.

The RCC and WDRC displacement mechanisms 64 and 66 connect through corresponding control shafts, or drive rods (not shown in FIG. 1), to the respective clusters of radiation control rods and water displacements rods 30 and 34, to control the respective vertical positions thereof and, particularly, selectively to lower and/or raise same through corresponding openings (not shown) provided therefore in the upper core plate 19, telescopingly into or out of surrounding relationship with the respectively associated fuel rod assemblies 20. In this regard, the clusters 30 and 34 have an extent of travel corresponding to the height of the fuel rod assemblies 20, as seen in FIG. 1. While the particular control function is not relevant to the present invention, insofar as the specific control over the reaction within the core is effected by the selective positioning of the respective rod clusters 30 and 34, it is believed that those skilled in the art will appreciate that moderation or control of the reaction is accomplished in accordance with the extent to which the control rod clusters 30 are inserted into or withdrawn from the core and with the effective water displacement adjustment which is achieved by selective positioning of the water displacement rod clusters 34. It is significant, however, that the RCC's 30 are adjusted in position relatively frequently, compared to the WDRC's 34, to achieve the desired power output level from the reactor. Conversely, the WDRC's 34, initially, are lowered, or inserted, fully into the lower barrel assembly 16 which contains the core of fuel rod assemblies 20, following each refueling and thus at the initiation of each fuel cycle. The WDRC's 32, through their respective drive rods (not shown in FIG. 1) and DRDM's 66, then are selectively removed as the excess reactivity is depleted, over the fuel cycle. Typically, this is performed by simultaneously removing a group of four such WDRC's 34 from their fully inserted positions in association with the fuel assemblies 20, to a fully raised position within the corresponding WDRC guide 32 and thus within the inner barrel assembly 24, in a continuous and controlled withdrawal operation. Each group of four WDRC's 34 is selected so as to maintain a symmetrical power balance within the reactor core. Typically, all of the WDRC's 34 remain fully inserted in the fuel assemblies 20 for approximately 60% to 70% of the approximately 18 month fuel cycle. Groups thereof then are selectively and successively withdrawn to the fully withdrawn position as the excess reactivity is depleted, so as to maintain a nominal, required level of reactivity which can sustain the desired output power level, under control of the variably adjustable RCC's 30. The vent system of the present invention thus serves to provide hydraulic energizing fluid to the DRDM's 66 in accordance with selectively controlling the WDRC raising and lowering functions, as above described.

The water flow through the vessel 10 proceeds generally from a plurality of inlet nozzles 11, one of which is seen in FIG. 1, downwardly through the annular chamber between an outer generally cylindrical surface defined by the cylindrical sidewall 12b of the vessel 12 and an inner generally cylindrical surface defined by the cylindrical sidewall 26 of the inner barrel assembly 24 and the cylindrical sidewall 17 of the lower barrel assembly 16. The flow then reverses direction and thereafter passes axially upwardly through flow holes 18a in the lower core plate 18 and into the lower barrel assembly 16, from which it exits through a plurality of flow holes 19a in the upper core plate 19 to pass into the inner barrel assembly 24, continuing in parallel axial flow therethrough and finally exiting upwardly through flow holes (not shown in FIG. 1) in the lower calandria plate 52. Thus, parallel axial flow conditions are maintained through both the lower and inner barrel assemblies 16 and 24. Within the calandria 50, the flow in general turns through 90° to exit radially from a plurality of outlet nozzles 13 (one of which is shown in FIG. 1).

The pressure of the flowing water, or reactor coolant, within the vessel 10 typically is in the range of about 2,250 psi. The reactant coolant pressure furthermore is communicated from the DRDM's 66 through respectively associated conduits 80, flow restricting devices 81, and conduits 82 to a group manifold 84; as shown in part, four DRDM's 66 are connected through respective conduits 82 to each associated group manifold 84. Additionally, a head vent 86 communicates through the dome 12a with this same source of reactant coolant pressure, as a part of the vent sytem of the present invention.

Figure 2:
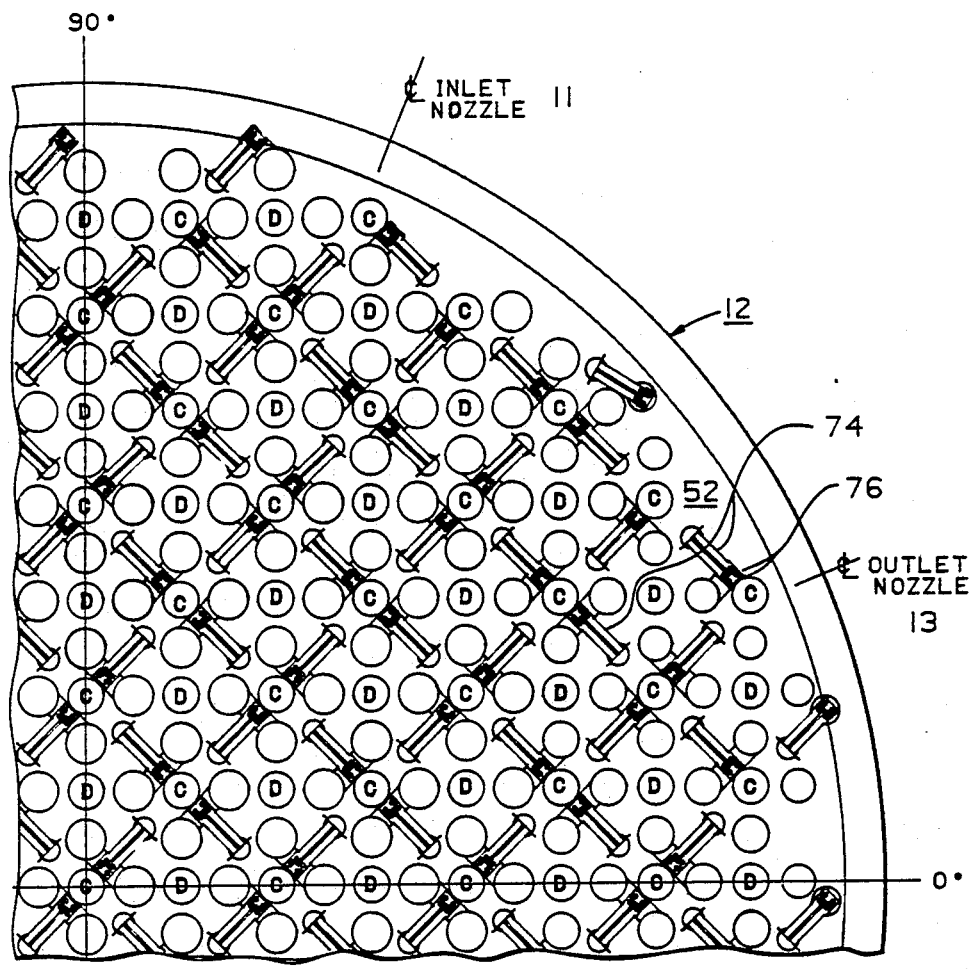
FIG. 2 is a simplified, or schematic, cross-sectional plan view illustrating the relatively dense packing of water displacer rod clusters and control rod clusters within the inner barrel assembly of the reactor vessel of FIG. 1.

FIG. 2 is a cross-sectional, schematic bottom planar view of the lower calandria plate 52 at a position, in FIG. 1, intermediate the mounting means 36 and 38 for the RCC and WDRC rod guides 28 and 32, respectively, and the plate 52; further, FIG. 2 is on an enlarged scale and represents only a quadrant of the internal structure of the calandria 50, for illustrating diagramatically the dense packing of the arrays of plural control and water displacer rod clusters 30 and 34 within the inner barrel assembly 24. Each of the circles labelled "D" represents an aperture, or hole, in the calandria plate 52 through which is received a corresponding DRDM drive rod, associated with a corresponding WDRC cluster; similarly, each of the circles marked "C" corresponds to an aperture in the calandria plate 52 through which is received a corresponding CRDM drive rod, associated with a corresponding RCC cluster 30. These apertures C and D provide fluid communication with the corresponding RCC and WDRC calandria tubes 56 and, particularly, through the shrouds and head extensions 62 for communicating the reactant coolant pressure to the DRDM's 66. Further, the remaining unlabelled circles in the lower calandria plate 52 in FIG. 2 provide for communicating the reactor coolant flow from the inner barrel assembly 24 to the calandria 50.

Elements 74 comprise leaf springs which are mounted in oppositely oriented pairs generally in alignment with the diameters of the RCC associated apertures "C," in an alternating, orthogonally related pattern. The free ends of the springs 74 bear downwardly upon the upper surfaces of the RCC mounting means 36 of a next-adjacent aperture "C," so as to provide a frictional force opposing lateral displacement thereof and accordingly of the associated rod guide 28, while affording a degree of flexibility to the axial position of the rod guide. While the use of springs 74 is one preferred structural mounting means for the RCC guides, in accordance with the disclosure of the above noted, copending application, entitled: "FLEXIBLE ROD GUIDE SUPPORT STRUCTURE FOR INNER BARREL ASSEMBLY OF PRESSURIZED WATER REACTOR," alternative mounting means may be employed for this purpose and thus the foregoing described structure is not to be deemed limiting in any sense, but merely illustrative.

FIG. 2 also illustrates the relative locations of the plural inlet and outlet nozzles 11 and 13 as seen in FIG. 1, it being understood that the quadrant of the vessel shown in the plan view of FIG. 12 is reflected as a mirror image about the 90° axis illustrated thereon and the combined configuration then is reflected about the 0°/180° axis to establish the full (360°) configuration of the vessel 12. Thus, there are provided a total of four inlet nozzles 11, two being equiangularly displaced about each of the 90° and 270° positions, and a total of four outlet nozzles 13, two being equiangularly displaced about each of the 0° and 180° positions. As will be apparent by comparison of FIGS. 1 and 2 and as will become more apparent with reference to the subsequent FIGS. 3 through 8 hereof, the RCC clusters and WDRC clusters are disposed in densely packed, interleaved arrays, substantially across the entire cross-sectional area of the inner barrel assembly 24.

The RCC and WDRC rod clusters 30 and 34 are supported by corresponding spiders 100 and 120, as illustratively shown in FIGS. 3 to 6, in turn connected through corresponding drive rods to the CRDM's 64 and DRDM's 66, an example of the DRDM 66 being shown in FIGS. 7 and 8, as hereafter described.

Figure 3:
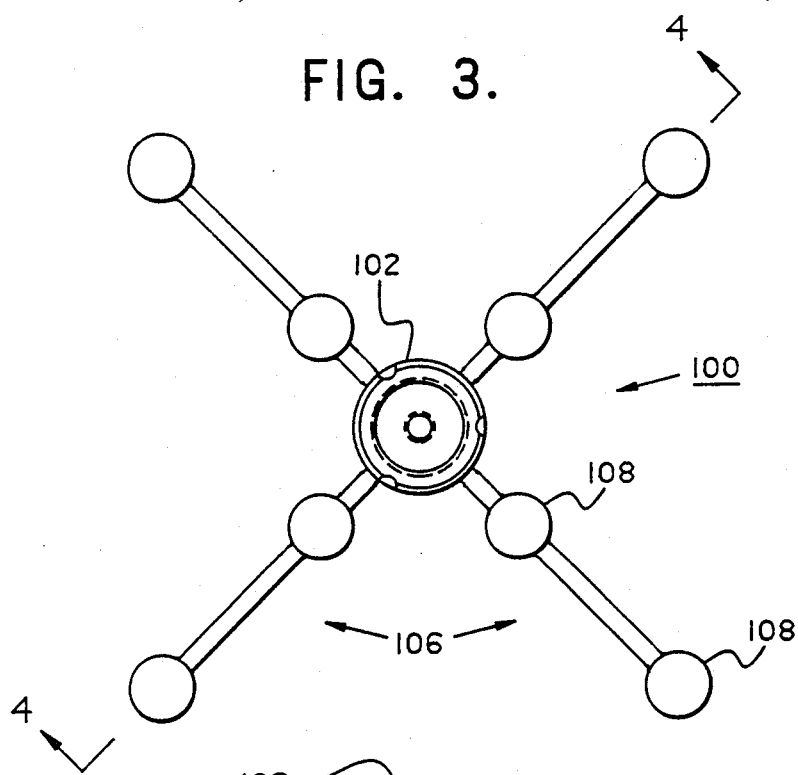
FIG. 3 is a plan view of an RCC spider.
Figure 4:
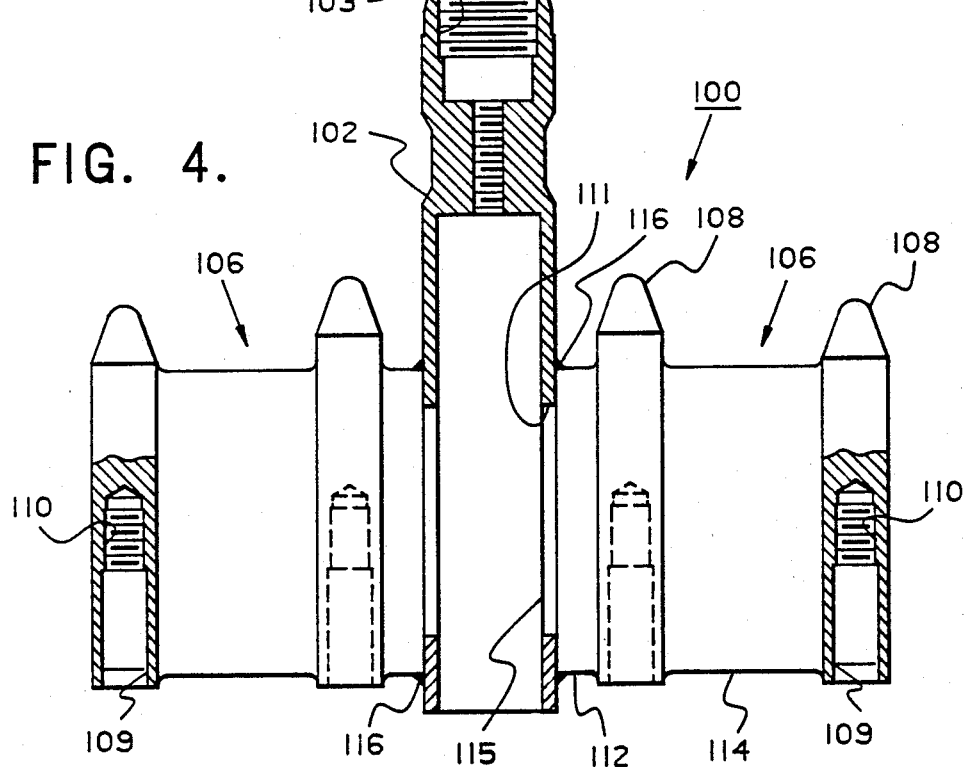
FIG. 4 is an elevational view, partially in cross-section, of the RCC spider of FIG. 3, taken along the line 4—4 in FIG. 3.

FIGS. 3 and 4 are plan and elevational views of an RCC spider 100, FIG. 3 being schematic in form and FIG. 4 being a partly broken-away, cross-sectional view taken along the line 4—4 in FIG. 3. The RCC spider 100 comprises a central hub 102 of generally cylindrical configuration having an upper, interiorally threaded end 103 for connection to a drive rod (not shown) which extends, as before described, upwardly to an RCC adjustment mechanism 64 by which the spider 100 and its associated control rods 30 (FIG. 1) may be vertically adjusted in position within and relative to the RCC rod guide 28 and correspondingly relative to the fuel rod assemblies 20, of FIG. 1. Vane assemblies 106 are secured at the respective inner edges thereof to the hub 102 and extend radially therefrom in quadrature, relative relationship. Each vane assembly 106 includes a pair of cylindrically-shaped rod support mounts 108, each thereof having an interior bore 109 including an interiorally threaded portion 110 into which the upper, correspondingly threaded end of a control rod (not shown) is threadingly engaged so as to be supported by the vane assembly 106 and corresponding hub 102.

Figure 5:
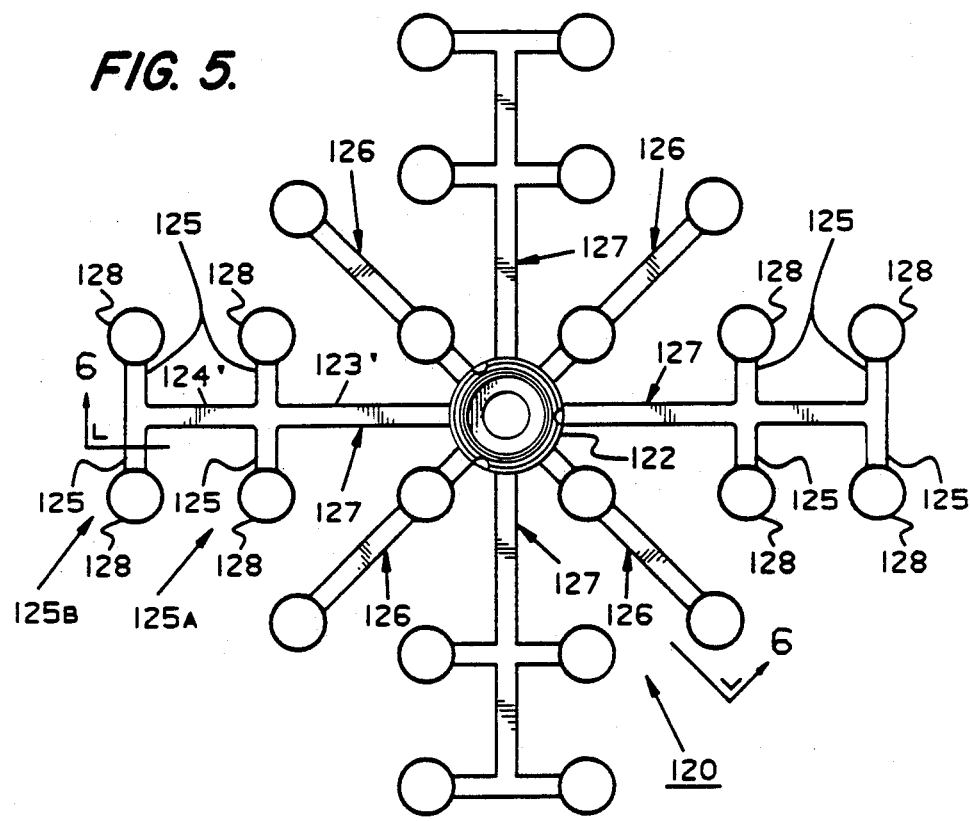
FIG. 5 is a plan view of a WDRC spider.
Figure 6:
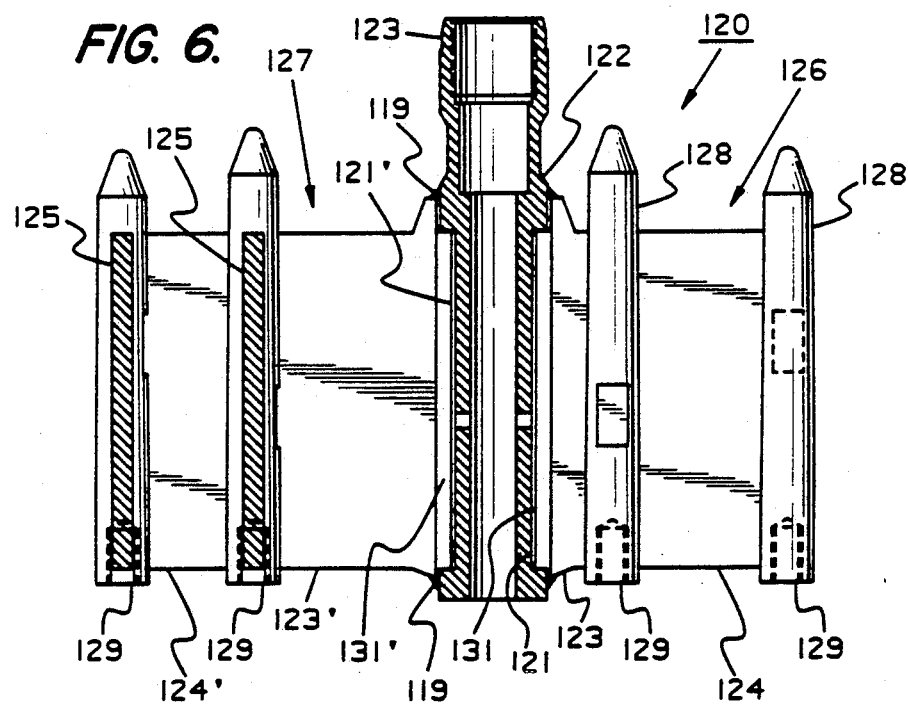
FIG. 6 is an elevational view, partially in cross-section, of the WDRC spider of FIG. 5, taken along the line 6—6 in FIG. 5.

FIGS. 5 and 6 illustrate a WDRC spider 120, FIG. 5 being a planar, generally schematic view, and FIG. 6 being an elevational view, partially in cross-section and taken along the line 6—6 in FIG. 5. Similarly to the RCC spider 100, the WDRC spider 120 includes a central hub 122 of generally cylindrical configuration, the upper end 123 being interiorally threaded to receive a drive rod which, as discussed in connection with FIG. 1, connects to a corresponding WDRC control mechanism 66. First and second types of vane assemblies 126, 127 are connected to the hub 122 in alternating, equiangularly displaced relationship so as to extend radially therefrom. The vane assemblies 126 are substantially similar to the RCC vane assemblies 106, as seen in FIGS. 3 and 4, and thus include a pair of radially displaced WDRC rod support mounts 128. As best seen in FIG. 5, the vane assemblies 126 are disposed to extend radially from the hub 122 in quadrature relationship, each intermediate an adjacent quadrature-related pair of vane assemblies 106 in the alternating sequence as above described. The vane assemblies 127 include integral, transverse vanes 125 extending from the integral radial vane segments 123' and 124' as first and second aligned and oppositely oriented pairs 125A and 125B, each thereof carrying a WDRC rod support mount 128 at its extremity. Each of the WDRC rod support mounts 128 includes a threaded bore 129 at its lower extremity for receiving, in threaded engagement therein, the top end of a corresponding WDRC rod.

The vane assemblies 106 and 126 include corresponding first and second planar vane elements 112, 114 and 123, 124, respectively, each thereof having longitudinal flanges for connecting the associated vane assemblies 106 and 126 to the respective, RCC spider hub 102 and WDRC spider hub 122. This structure is illustrated for the RCC spider 100 in FIG. 4 by the receiving slot 111 in the hub 102 and the flange 115 received therein, and is illustrated for the WDRC spider 120 in FIG. 6 by the receiving slot 121 in the hub 122 and the flange 131 associated with the first planar vane element 123, received therein.

The second type of vane assembly 127 of the WDRC spider 120, as seen in FIG. 6, corresponds substantially to the first vane assembly 126 in that it includes first and second planar vane element portions 123' and 124' which are integrally formed and extend radially from the hub 122, the first portion 123' having a longitudinal flange 131' received in a corresponding receiving slot 121' in the hub 122. The assembly 127 furthermore includes first and second pairs 125a and 125b of third planar vane elements 125 integrally formed with and extending transversely from the first and second integral vane element portions 123' and 124', the first pair 125a being formed intermediate the portions 123' and 124' and the second pair 125b being formed on the outer longitudinal edge of the second vane element portion 124'. Each of the elements 125 carries a rod support mount 128 on its outer longitudinal edge. It will be understood that the third, or transverse, planar vane elements 125 may include similar flange structures on their outer longitudinal edges for mounting the corresponding rod support mounts 128.

In assembling the respective RCC and WDRC spiders 102 and 120, the innermost planar vane elements 112, and 123, 123' preferably are positioned with the respective flanges 115 and 131, 131' inserted into the corresponding receiving slots 111 and 121, 121' of the associated hubs 102 and 120, and then spot welded in place at the upper and lower extremities thereof, as indicated by weld beads. Thereafter, the joints are brazed along the entirety of the lengths thereof.

Referring now to FIG. 7, the displacer rod drive mechanism (DRDM) 66 receives a drive rod 132 which is connected to a WDRC spider 120. The DRDM 66 is shown more fully in the noted U.S. Pat. No. 4,439,054. Briefly, the DRDM 66 comprises a substantially cylindrical metal housing 136 which is welded to a head extension 62, which extends through the dome, or head 12a. Housing 136 has a cap 138 attached to the top thereof which has a channel 140 therethrough that is connected to conduit 80, as shown in FIG. 1. Since the interior of housing 136 is exposed to the interior of reactor vessel 12, the reactor coolant fills the void spaces within housing 136 and flows therefrom through channel 140 and conduit 80 under controlled conditions, to be explained. A bearing housing 146 is removably disposed within housing 136 and has a plurality of first piston rings 148 attached to the outside thereof near its lower end which extend into contact with the inside of housing 136 for aligning bearing housing 146 within housing 136 but allowing for the removal of bearing housing 146. Drive rod 132 is slidably disposed within bearing housing 146 in a manner so as to be able to be moved axially with respect to bearing housing 146 and housing 136 under the influence of the reactor coolant pressure. A plurality of second piston rings 150, which may be Inconel, are removably disposed within bearing housing 146 so as to be able to contact drive rod 132. Second piston rings 150 provide a mechanism for allowing drive rod 132 to slide within bearing housing 146 while limiting the flow of reactor coolant through bearing housing 146 and housing 136 when the vent system permits fluid flow through conduit 80, the movement of drive rod 132 thus being controlled by the vent system of the invention. Second piston rings 150 are arranged so that they may be replaced when bearing housing 146 is removed from housing 136.

Referring now to FIGS. 7 and 8, a plurality of roller bearings 152 are disposed on a like number of axles 154 in a manner so as to allow the outer surface of roller bearings 152 to contact the outer surface of drive rod 132 while allowing the rotation of roller bearings 152. As shown in FIG. 8, four roller bearings 152 may be used so as to align drive rod 132 within bearing housing 146 while aiding in the movement of drive rod 132. A plurality of screws 156 corresponding to the number of roller bearings 152 are used to attach holding member 158 to bearing housing 146 so as to hold roller bearings 152 within bearing housing 146 yet allow replacement thereof by removal of screws 156 and holding member 158. In a like manner, a second set of roller bearings 160 are disposed at the other end of bearing housing 146 to provide alignment of drive rod 132.

Referring again to FIG. 7, drive rod 132 has a flexible rod 162 attached to the top end thereof which may be an Inconel rod. Flexible rod 162 has a spear-shaped member 164 attached to its top end. A hollow cylindrical divider 166 is attached to the lower end of cap 138, in colinear alignment with channel 140. Divider 166 defines chambers 168, 169 and 170 in the bottom end of cap 138, each of a size to accommodate the spear member 164. The spear-shaped member 164 cooperates with a pivoted latch mechanism 172 in a manner more fully described in U.S. Pat. No. 4,439,054. The latch 172 is normally spring biased to the slanted, or angularly offset position indicated in FIG. 7, and is mounted for pivotal movement in a clockwise direction in which the right-hand side thereof engages the interior of the wall of housing 136. Generally, during upward movement of the rod 132, the spear-shaped member moves upwardly along the slanted surface of the latch mechanism 172 as indicated in phantom lines, ultimately passing beyond the upper edge thereof and being received in the first chamber 168, the latch 172 being deflected by that movement to pivot in a clockwise direction and provide clearance for the motion of the spear shaped member 164 and then returning to its initial position by the spring biasing. The bottom end of cap 138 functions as a stop to prevent further upward movement of the member 164 and thus the drive rod 132. When pressure is equalized within the DRDM 66 so as to remove the differential pressure driving the rod 132 upwardly, in a manner to be described, the weight of the rod 132 and attached WDRC cluster causes the same to fall by gravity, the member 164 being received in the first bore 178 of the latch 172 and supported on ledge 182 to stop the downward movement, this action furthermore pivoting latch 172 to a vertically aligned position this locking, or parking, the rod 132 in its up position.

To release the drive rod 132 from the locked, up position, the vent system is operated to cause a pressure differential again to be created, acting on the rod 132 so as to drive it upwardly through the bore 178 and into the central chamber 170, upward movement again being halted by the lower surface of cap 168 which acts as a stop on the element 164. The pressure differential then is removed by suitable controls of the vent system and the rod 132 and its associated WDRC 34 then falling by weight of gravity, pulling the member 164 through the second bore 180 and in turn pivoting the latching mechanism 172 in a clockwise direction; since bore 180 extends axially throughout the latch mechanism 172, member 164 is free to pass therethrough and thus permit rod 132 and its associated WDRC 34 to fall gradually throughout the entire extent of its travel, fully inserting the WDRC 34 into association with the fuel assemblies 20 in the lower barrel 16. As described more fully in the referenced U.S. Pat. No. 4,439,054, latch mechanism 172 includes suitable slots in the generally vertically oriented sidewalls thereof through which the flexible rod 162 may pass, to permit movement thereof transversely through the sidewalls defining the bores 178 and 180 of the latch mechanism 172, the slots of course being smaller than the element 164, which travels through the bores 178 and 180, as above described.

An alternative configuration of the DRDM 66, relative to that shown in FIGS. 7 and 8, as well as a more detailed illustration of the vessel 12, are disclosed in the concurrently filed application entitled "PRESSURIZED WATER REACTOR HAVING DISCONNECTABLE TWO-PIECE DRIVE ROD ASSEMBLIES, AND RELATED METHODS OF ASSEMBLY AND MAINTENANCE OPERATIONS," having coinventors common to those of the present invention and assigned to the common assignee hereof, and incorporated herein by reference.

Figure 9:
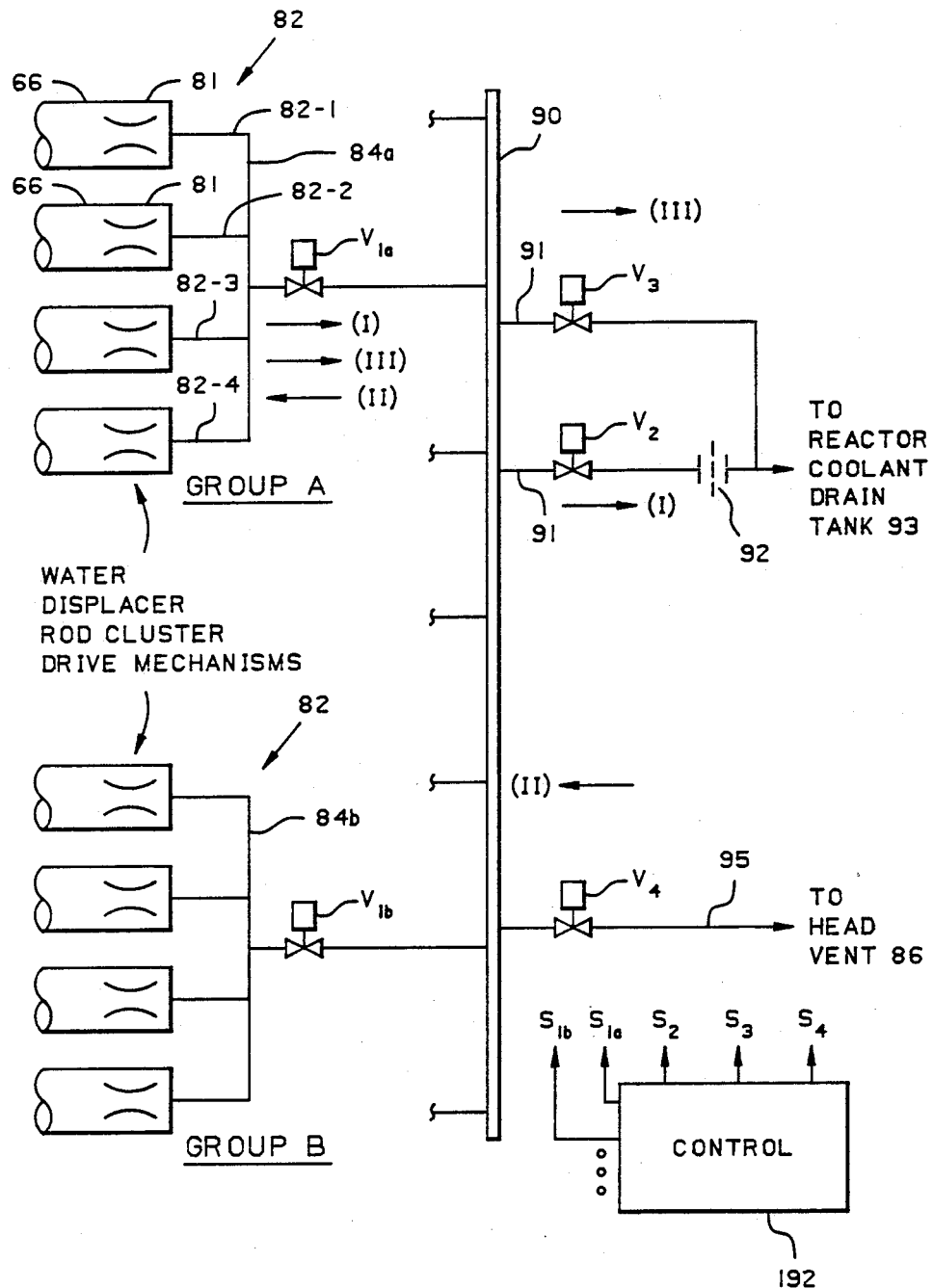
FIG. 9 is a partially schematic and partially diagramatic illustration of the vent system of the present invention.

FIG. 9 is a schematic of the vent system of the invention, in which like elements are identified by like numerals as in FIG. 1. As before noted, four WDRC's 34 are joined in a group for common actuation, and thus FIG. 9 illustrates four DRDM's 66 in each of groups A and B, having respective flow restricting devices 81 connected through corresponding conduits 82 (individually designated 82-1, 82-2, 82-3 and 82-4, for group A), a group manifold 84a, through a corresponding group valve $V_{1a}$ to a system manifold 90. Group B is correspondingly connected through a group manifold 84b and valve $V_{1b}$ to the system manifold 90. System manifold 90 schematically indicates connections to plural such groups; as above noted, 22 groups, of four DRDM's 66 each, comprises an exemplary implementation of the system.

The system manifold 90 further is connected through conduit 91, system valve $V_2$, and orifice 92 to a conventional reactor coolant drain tank (RCDT) 93, maintained at and thus functioning as a reservoir of normal atmospheric pressure (i.e., 15 psi). Additionally, the system manifold is connected through a bypass line 94 and system valve $V_3$ directly to the RCDT 93, thus bypassing the orifice 94. Finally, a conduit 95 connects the head vent 86 (FIG. 1) through system valve V4 to the manifold 90.

The flow designations I, II, and III and the associated flow direction arrows correspond to the three selected modes of operation and flow conditions, selectively established by the control functions of the vent system of the invention. Flow condition I corresponds to a normal withdrawal operation. For example, to withdraw group A, system valve V2 is opened first, to vent the system manifold 90 through orifice 92 to the RCDT 93. Group valve $V_{1a}$ then is opened to vent the DRDM's 66 of group A through the corresponding flow restrictors 81 to the manifold 90. The reactor coolant pressure applied to the interior of the DRDM's 66, as before noted, is about 2,250 psi, whereas a pressure of about 15–30 psi is established at the common orifice 92.

By proper selection of the characteristics of the flow restricting devices 81 and the orifice 92, and the predetermined leakage past the piston rings 150 of the DRDM 66, controlled, reasonably slow movement of the drive rods associated with the respective DRDM's 66 results, gradually withdrawing the corresponding WDRC's 34 from within the lower barrel assembly 16 and into the fully withdrawn position within the inner barrel assembly 24. Group valve $V_{1a}$ then is closed, following which the pressure differential within the DRDM 66 is dissipated through leakage of the reactor coolant past the piston rings 150. Once equilibrium is reached, the associated WDRC's 34 begin to drop, under the force of gravity, causing the respective engaging latches 72 of the DRDM's 66 to pivot and lock the associated WDRC's 34 in their parked, raised position.

Flow condition (II) corresponds to an insertion operation for releasing WDRC's 34 which are in the fully withdrawn and locked position, and then inserting same into the lower barrel assembly 16. As before noted, release from the latched position requires that the drive rod 132 first be raised; thus, the flow condition (I) is initiated for a sufficient time to raise the drive rods 132, by briefly opening group valve $V_{1a}$ and system valve $V_2$. System valve $V_2$ then is closed and system valve $V_4$ opened, conveying the system coolant pressure from head vent 86 through conduit 95 to system manifold 90 and through the still opened group valve $V_{1a}$, group manifold 84a, and conduits 82 and flow restrictors 81 to the respective channels 140 of the DRDM's 66, thereby equalizing the pressure on the drive rods 132 and permitting the respective WDRC's 34 to fall by force of gravity and be inserted fully into the lower barrel assembly 16. The positive pressure equalization step achieved by opening system valve V4 is dictated by the fact that tolerances, temperature differences, and the like can result in inadvertent sealing of, and thus the absence of the intended leakage past, the piston rings 150.

Flow condition (III) is afforded to accommodate certain unexpected circumstances, such as that of a WDRC 34 which is inadvertently stuck in position, preventing movement thereof in respect to the normal flow condition (I). As later described, sensors detect such a condition, in which one or more of the WDRC's 34 of a given group, e.g., group A, has or have failed to achieve the withdrawn state. In that circumstance, the system valve $V_3$ in the bypass conduit 94 is opened (system valve $V_2$ and group valve $V_1$ remaining in the opened condition), bypassing the common orifice 92. This produces a substantial incease, typically by several hundred psi, in the pressure differential across the piston rings 150, thereby seating the malfunctioning piston rings 150 and reestablishing a sufficient pressure differential to withdraw the affected WDRC's 34 to the intended, fully raised position. At this juncture, with all of the four WDRC's 34 in the fully withdrawn position, group valve $V_1$ and system valves $V_2$ and $V_3$ are closed, permitting the WDRC's 34 to settle into the parked position, engaging the respective latch mechanisms 72 of the associated DRDM's 66.

Figure 10:
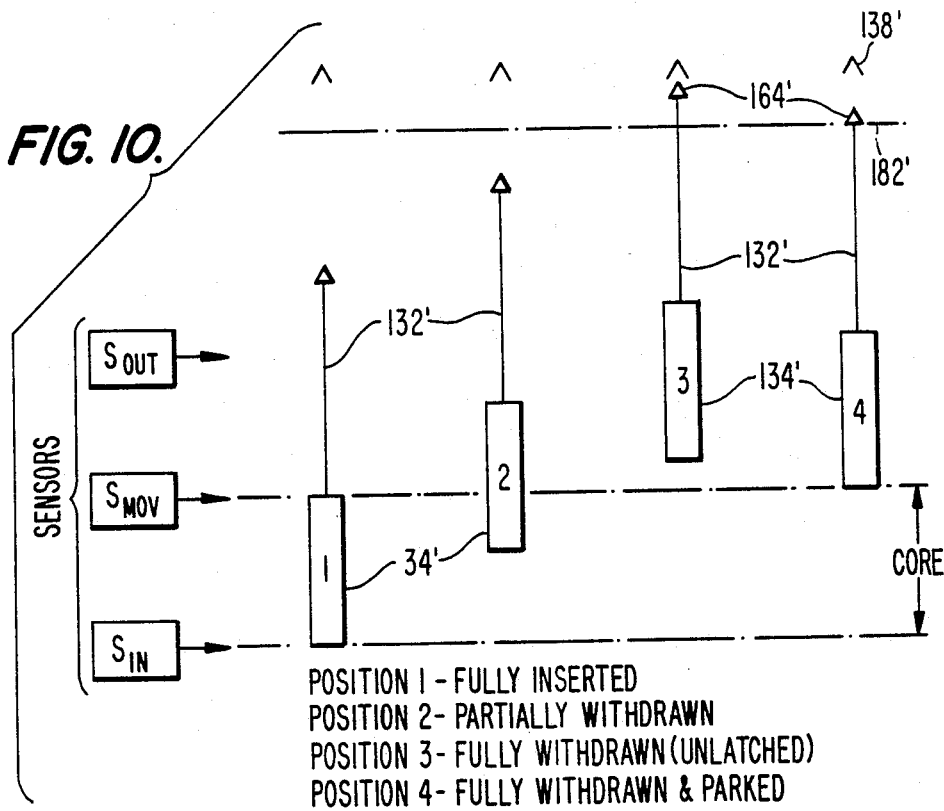
FIG. 10 is a simplified diagramatic view of a group of water displacer rod clusters (WDRC's) and associated drive mechanisms (DRDM's) illustrating successive positions thereof in a cycle of selective positioning operations, and associated sensor devices.

FIG. 10 is a schematic representation of the movement of a drive rod 132' and associated WDRC 34' from position 1 representing a fully inserted condition, through intermediate positions 2 (indicated by a single such position) during movement, which may be either withdrawal or insertion in this respect, position 3 which is the above-latched position to which the rod and element 164' must be moved for interacting with the latch mechanism 172 of FIG. 7, and position 4 which is the parked position in which the element 164' rests on the ledge 182', the primed numerals corresponding to the structural elements of FIG. 7 in each instance. FIG. 10 also illustrates a stop 138', corresponding to the lower surface of cap 138 in FIG. 7 and the abutment of element 164 therewith for limiting upward movement. Sensors $S_{IN}$, $S_{MOV}$, and $S_{OUT}$ detect the presence of the assemblage of the rod guide 132' and WDRC 34', generally illustrated in this instance as detecting the WDRC 34'. Other sensor locations of course may be adopted, where more convenient. Thus, $S_{IN}$ detects the fully inserted position of WDRC 34'; any interim position of WDRC 34' is detected by sensor $S_{MOV}$, and sensor $S_{OUT}$ detects the WDRC 134' when raised to the overlatch position 3 and also when parked at position 4. An independent sensor may be employed to detect position 3, and thus to delineate between positions 3 and 4, if desired, as will be apparent.

Figure 11:
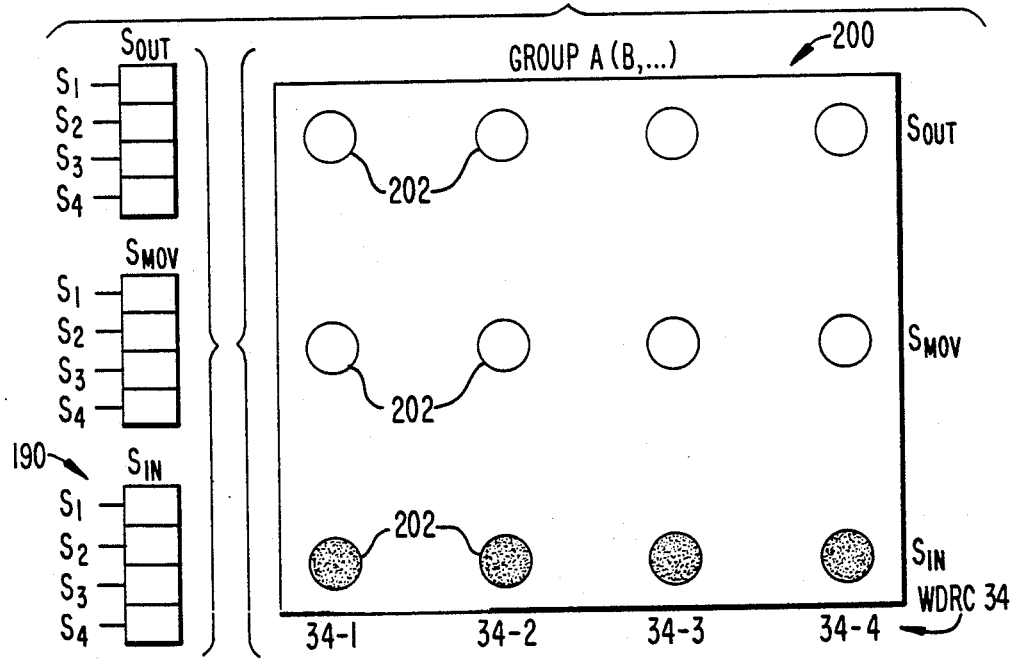
FIG. 11 is a simplified, schematic illustration of sensors and an associated display, as utilized in operation of the vent system of the present invention.

FIG. 11 is a schematic illustration of a display 200 associated with the sensors 190 corresponding to a typical group of four WDRC's 34 of a group. Thus, each of the position sensors $S_{OUT}$, $S_{MOV}$ and $S_{IN}$ includes four sensors $S_1$ through $S_4$, respectively corresponding to the four WDRC's 34 of the associated group. Display 200 correspondingly includes plural indicators 202, which may be conventional lights, including a first row of lights 202 representing the $S_{IN}$ position of each of a group of four WDRC's 34, the vertical columns of indicators 202 thus being designated 34-1 through 34-4, and the rows of indicators 202 correspondingly being designated $S_{IN}$, $S_{MOV}$ and $S_{OUT}$. As will be apparent, indicators 202 correspondingly are energized in response to the sensor signals to indicate the positions of the respective WDRC's 34-1 through 34-4. Normally, the indictors will sequence in substantially coordinated fashion from $S_{IN}$ through $S_{MOV}$ to $S_{OUT}$ and remain at the latter during a normal withdrawal and park operation, or will sequence in reverse during a normal insertion operation. Should any missequencing occur, the indicator lights 202 for each WDRC 34 which is out of sequence with the others will correspondingly produce an indication which is inconsistent with the remainder. For example, WDRC 34-1 may produce an $S_{MOV}$ indication whereas WDRC's 34-2 through 34-4 may produce $S_{OUT}$ indications, the display thus alerting the operator to the circumstance that WDRC 34-1 failed to achieve a fully withdrawn and latched state whereas the remainder performed the function as intended.

As before noted, condition III in which valve $V_4$ is opened produces an additional pressure differential for driving WDRC 34-1 upwardly to the latch position. A successful operation will then result in the proper indication for WDRC 34-1, consistent with the remainder of the group.

A special circumstance also may occur which again will produce a missequenced display indication on the display panel 200. For example, if the $V_1$ or $V_2$ valves of FIG. 9 are closed prematurely, in that some but not all of the WDRC's 34 of a given group have reached position 3 of FIG. 10, those which have done so will progress to the parked position 4, but the remainder will continue to be in position 2. Reestablishing flow condition I to complete withdrawal of the nonlocked WDRC 34 will cause those in the locked position 4 to progress through the unlatching and insertion sequence, while the WDRC 34 which failed to achieve that state may proceed to the fully withdrawn and parked condition 4—continuing the missequencing problem.

To remedy this circumstance, the following procedure is implemented. If such missequencing occurs, the vent system is operated in the following procedure. Flow condition II is initiated, by opening valve $V_4$ and then, assuming group A to be missequenced, valve $V_{1a}$ is opened; this circumstance is maintained until the partially withdrawn WDRC 34 (i.e., in position 2) reaches a fully inserted position, i.e., position 1 of FIG. 10 as indicated by extinction of the $S_{in}$ indicator 202 of FIG. 11 for the affected WDRC 34. Valve $V_4$ then is closed, terminating condition II. Valve $V_2$ thereupon is opened for a period of approximately 30 seconds, and then closed; since valve $V_3$ is assumed to be closed in this step, and valve $V_{1a}$ is open, the operation of valve $V_3$ reestablishes flow condition I for a sufficient time to unlatch the WDRC's 34 of the group which theretofore had properly been advanced to the latched and parked, fully withdrawn position. The previously malfunctioning WDRC 34 will be driven in the upward, or withdrawal direction as well (e.g., advancing from position 1 to an intermediate position 2 as illustrated in FIG. 10); however, the time interval for that WDRC 34 to rise to the fully withdrawn position (e.g., position 3 of FIG. 10) is significantly longer (e.g., 1.5 to 2 minutes) than the interval (of approximately 30 seconds) during which valve $V_2$ is opened, such that the malfunctioning WDRC 34 will not rise to a fully withdrawn position. The subsequent opening of valve $V_4$ to establish flow condition II thus serves to permit the malfunctioning WDRC 34 to fall by gravity to the fully inserted position 1 (of FIG. 10), and to permit the WDRC's 34 which had been in the intended, proper sequence to proceed from the fully withdrawn, but now unlatched position, and descend under the force of gravity to join the theretofore missequenced WDRC 34 in the fully inserted position 1. Flow condition I then is reestablished to withdraw all WDRC's 34 of the group in proper coordinated and sequenced relationship to the fully withdrawn and, then, latched positions 3 and 4 (FIG. 10).

The foregoing operations of valves $V_1$ through $V_4$ may readily performed by an operator through the control panel 192 of FIG. 9, in response to the display indications of display panel 200 of FIG. 11. Particularly, the control panel 192 may provide for transmitting respective solenoid actuating signals $s_{1a}$, $s_{1b}$, ... $s_2$, $s_3$, $s_4$ to the respectively corresponding valves $V_{1a}$, $V_{1b}$, ... $V_2$, $V_3$, and $V_4$ achieve the foregoing flow conditions, consistent with establishing the desired positions of the WDRC's 34, at all times throughout the fuel cycle.

The flow restrictors 81 may be of a commercially available type sold under the trade name "LEE AXIAL VISCO JET," having a typical Lohms rating of 680 or 910 depending upon the speed of withdrawal required. Each of the valves V may comprise direct lift solenoid valves sold by Valcor Engineering Corporation of Springfield, N.J. under the designation 2-WAY "N" Series 526D. The orifice 92 may be formed by drilling a hole through a plate or disk which is then positioned in the vent line either by welding or bolting it between flanges. The size of the hole is selected to attain the proper flow impedance which, in conjunction with the flow restrictor 81, controls the speed of withdrawal. As an example, a 0.075 inch diameter hole would give a Lohm rating of approximately 150.

In accordance with the foregoing, the vent system of the present invention provides for efficient and effective control of the displacer rod drive mechanisms (DRDM's) 66 and the respectively associated groups of plural symmetrically disposed WDRC's 34, including the capability of correcting for possible malfunctions in the travel of any given WDRC 34 and/or missequenced conditions which may inadvertently occur. The vent system moreover is economical and efficient both in its assemblage and operation, utilizing the available pressure within the vessel 12 as the power source, while permitting use of commercially available components to implement the system.

The vent system moreover affords significant safety factors in its disclosed implementation, while achieving an economic and efficient design. The provision of a common manifold 90 enables use of a single orifice 92 and associated valve $V_2$ as well as a single valve $V_3$ affording the bypass function before noted, and a single valve $V_4$ providing connection of the head vent 86 to the common manifold 90. These common, or system, elements thus are time shared by the plural groups of DRDM's 66, achieving cost economies.

Further, this design takes into account safety factors in the operation of a reactor system. Specifically, if two or plural groups of WDRC's 34 were withdrawn simultaneously, power overshoots might occur, presenting a potential danger. The present system, however, eliminates that possible concern, through the use of the single, common orifice 92 which limits the total system flow rate to a Lohm value consistent with the desired rate of withdrawal of only a single group of WDRC's 34. Thus, if inadvertent connection of two or more groups of WDRC's 34 to the common manifold 90 occur, the resulting flow rate established by the common orifice 92 would be shared in parallel by the DRDM's 66 of the subject groups, greatly reducing the rate of simultaneous withdrawal of the plural groups. Indeed, if several groups were simultaneously connected to the common manifold 90, the shared flow rate for any individual DRDM, or group thereof, would be so limited that withdrawal of any thereof effectively would be precluded. Thus, the system minimizes components, and thus the cost, while affording a significant safety feature as well. In a related, safety aspect, the provision of individual flow restrictors 81, while not necessary to restrict the flow in view of the provision of the common orifice 92 which theoretically could suffice, alone, for that purpose, affords a safety feature in the event that the common orifice 92 were bypassed, such as by a break in the conduit 91.

Numerous modifications and adaptations of the present invention will be apparent to those of skill in the art and thus it is intended by the appended claims to cover all such modifications and adaptations which fall within the true spirit and scope of the present invention.

We claim as our invention:

1. A pressurized water reactor system including a pressure vessel having provided therein, at successively higher elevations, a lower barrel assembly for receiving plural fuel rod assemblies therein in parallel axial relationship, an inner barrel assembly for receiving plural clusters of rods mounted in parallel axial relationship for selectively controlled, axial movement in telescoping relationship with the fuel rod assemblies between a fully inserted position within the lower barrel assembly and a fully withdrawn position within the inner barrel assembly, and a head assembly in sealed communication with the lower and inner barrel assemblies for containing the pressurized reactor coolant fluid within the vessel, and a vent system for selectively driving the rod clusters between the fully withdrawn and fully inserted positions, comprising:

a plurality of drive rods respectively connected to said plurality of rod clusters and movable axially therewith through a path of travel corresponding to the movement of the respective rod clusters between the fully withdrawn and the fully inserted positions thereof;

a plurality of drive means disposed in parallel axial relationship on and extending in sealed relationship through the head assembly and in communication with the pressurized coolant fluid therein, each said drive means receiving therein, in sealed relationship, an upper end portion of a corresponding drive rod and permitting relative axial movement thereof through the path of travel, each said drive means having a leakage passage therein through which a leakage flow of the reactor coolant fluid may pass thereby to establish pressure equilibrium within said drive means producing substantially no net force acting on the associated drive rod and having an output channel through which the leakage flow of the reactor coolant fluid may pass to the exterior of said drive means to create a pressure differential therewithin establishing a net force acting on said drive rod to move same upwardly through said path of travel to the fully withdrawn position of the associated rod cluster, and mechanical engaging means selectively operable to engage an upper end portion of the drive rod and mechanically support same at the aforesaid fully withdrawn position thereof;

a reservoir maintained at substantially atmospheric pressure;

means associated with said plural drive means and said reservoir, selectively operable for connecting the corresponding output channels of selected said drive means to said reservoir to enable the leakage flow in said selected drive means to pass through the corresponding said output channel of each such selected drive means and establish a pressure differential therewithin;

a vent connection through said head assembly in communication with the pressurized reactor coolant fluid therewithin; and means associated with said plural drive means and said vent connection, selectively operable for connecting the corresponding output channels of selected, said drive means to said vent connection to positively establish pressure equilibrium within each such selected drive means.

2. A pressurized water reactor system as recited in claim 1, wherein:

the combined weight of each said drive rod and connected rod cluster associated with a given said drive means is sufficient to permit said drive rod and connected rod cluster to fall by force of gravity to said fully inserted position of said rod cluster, as the pressure differential within the associated said drive means reduces to pressure equilibrium therein.

3. A pressurized water reactor system as recited in claim 1, further comprising:

plural sensing means for selectively sensing respectively corresponding said rod clusters at their fully inserted positions, at intermediate positions between said fully inserted and said fully withdrawn positions and at said fully withdrawn positions thereof, and producing corresponding sensor output signals; and a plurality of display indicators respectively corresponding to said plurality of rod clusters and including, for each said rod cluster, plural display indicators individually and respectively responsive to the corresponding said sensor signals for selectively indicating at least the fully inserted position, an intermediate position, and the fully withdrawn position of the respectively corresponding rod cluster.

4. A pressurized water reactor system as recited in claim 1, further comprising:

first, second and third sensor means corresponding to each said rod cluster for selectively sensing same at said fully inserted position, at an intermediate position between said fully inserted and fully withdrawn positons and at said fully withdrawn position thereof, and producing corresponding sensor outputs; and display means having first, second and third display indicators respectively associated with each said rod cluster; and means for connecting the outputs of said first, second and third sensors for each said rod cluster to said respectively associated first, second and third display indicators of said display means to provide a visual indication of the position of each said rod cluster.

5. A pressurized water reactor system as recited in claim 1, further comprising:

control means for selectively operating said selective connecting means for selectively controlling the movement of said plural rod clusters between said fully withdrawn and fully inserted positions of each thereof.

6. A pressurized water reactor system as recited in claim 1, wherein:

said plural clusters of rods comprise water displacement rods normally fully inserted within said lower barrel assembly at the beginning of each fuel cycle of the reactor system.

7. A pressurized water reactor system as recited in claim 6, wherein there are further provided:

plural clusters of reactor control rods;

plural drive rods respectively connected to said plural reactor control rod clusters and movable axially therewith through a path of travel corresponding to the movement of the respective reactor control rod clusters between fully withdrawn and fully inserted positions, said reactor control rod cluster drive rods extending for axial movement in sealed relationship through the head assembly;

a plurality of reactor control rod cluster drive means disposed in parallel axial relationship on said head assembly, each thereof receiving an upper end portion of a corresponding control rod cluster drive rod and being operable to selectively move same for continuously selective positioning of the associated control rod cluster between said fully inserted and fully withdrawn positions;

said respective pluralities of drive means for said pluralities of water displacement rod clusters and said reactor control rod clusters being disposed in interleaved, parallel axial relationship on said head assembly.

8. A pressurized water reactor system as recited in claim 1, wherein:

the combined weight of each said drive rod and connected rod cluster associated with a given said drive means is sufficient to permit said drive rod and connected rod cluster to fall by force of gravity to said fully inserted position of said rod cluster, as the pressure differential within the associated said drive means reduces to pressure equilibrium therein;

each said drive means includes a stop for limiting the upward path of travel of the associated drive rod when moving to said fully withdrawn position of the associated rod cluster; and said mechanical engaging means of each said drive means includes means for mechanically engaging the upper end of the associated drive rod after said drive rod reaches said limiting stop and subsequently to pressure equilibrium being established therein, as said drive rod begins to fall by force of gravity, thereby to support same at the aforesaid, fully withdrawn position thereof.

9. A system as recited in claim 8, wherein:

each said drive means, when selectively connected at said output channel thereof to said reservoir, passing a leakage flow through the output channel thereof and establishing the aforesaid pressure differential therein, for producing a net force raising the upper end of the associated drive rod toward said stop and releasing same from said mechanical engaging means; and each said drive means, when selectively connected at said output channel thereof to said vent connection, establishing pressure equilibrium therein for permitting the corresponding said rod guide and associated rod cluster to drop by force of gravity to the fully inserted position thereof.

10. A pressurized water reactor system including a pressure vessel having provided threrein, at successively higher elevations, a lower barrel assembly for receiving plural fuel rod assemblies therein in parallel axial relationship, an inner barrel assembly for receiving plural clusters of rods mounted in parallel axial relationship for selectively controlled, axial movement in telescoping relationship with the fuel rod assemblies between a fully inserted position within the lower barrel assembly and a fully withdrawn position within the inner barrel assembly, and a head assembly in sealed communication with the lower and inner barrel assemblies for containing the pressurized reactor coolant fluid within the vessel, and a vent system for selectively driving the rod clusters between the fully withdrawn and fully inserted positions, comprising:

a plurality of drive rods respectively connected to said plurality of rod clusters and each movable axially therewith through a path of travel corresponding to the movement of the respective rod cluster between the fully withdrawn and the fully inserted positions thereof;

a plurality of drive means disposed in parallel axial relationship on and extending in sealed relationship through the head assembly and in communication with the pressurized coolant fluid therein, each said drive means receiving therein, in sealed relationship, an upper end portion of a corresponding drive rod and permitting relative axial movement thereof through the path of travel, each said drive means having a leakage passage therein through which a leakage flow of the reactor coolant fluid may pass thereby to establish pressure equilibrium within said drive means producing substantially no net force acting on the associated drive rod and having an output channel through which the leakage flow of the reactor coolant fluid may pass to the exterior of said drive means thereby to create a pressure differential therewithin establishing a net force acting on said drive rod to move same upwardly through said path of travel to the fully withdrawn position of the associated rod cluster, and mechanical engaging means selectively operable to engage an upper end portion of the drive rod and mechanically support same at the aforesaid fully withdrawn position thereof;

a plurality of group manifolds, each group manifold being connected in parallel to the outlet channels of a respectively corresponding group of predetermined drive means;

a system manifold;

a plurality of first valve means respectively connected to said plurality of group manifolds, each of said first valve means being individually, selectively operable for selectively connecting and disconnecting the respectively corresponding group manifold of a selected group of drive means to said system manifold;

a reservoir maintained at substantially atmospheric pressure;

second valve means for selectively connecting and disconnecting said system manifold to said reservoir;

each said first valve means, when selectively operated to connect said corresponding group manifold of a selected group of drive means to said system manifold, functioning in cooperation with said second valve means, when operated to connect said group manifold to said reservoir, to permit a leakage flow to pass through the output channels of the corresponding drive means of the selected group and to establish the aforesaid pressure differential in each thereof;

each said first valve means, when selectively operated to disconnect said corresponding group manifold from said system manifold, blocking the leakage flow through the corresponding output channels of said drive means of said associated group thereby to establish pressure equilibrium within each of said corresponding drive means of said selected group;

a vent connection to said vessel in communication with the pressurized reactor coolant fluid therein;

further valve means selectively operable to selectively connect and disconnect said vent connection to said system manifold; and each of said first valve means, when operated to connect said corresponding group manifold to said system manifold, functioning in cooperation with said further valve means, when operated to connect said vent connection to said system manifold, to establish the aforesaid pressure differential within each of said corresponding drive means of said selected group thereof and prevent leakage flow through the respective output channels thereof.

11. A pressurized water reactor system as recited in claim 10, further comprising:

an orifice connected between said second valve means and said reservoir for restricting the rate of flow from said system manifold, when selectively connected to said reservoir by said second valve means, and thereby the rate of leakage flow from each said group manifold corresponding to a selected group of said drive means and selectively connected by said corresponding first valve means to said system manifold, thereby to limit the rate of decrease of an existing pressure differential to pressure equilibrium within said drive means of each said selected group.

12. A pressurized water reactor system as recited in claim 11, further comprising:

plural flow restrictors respectively associated with said plural drive means and connected between said output channels thereof and the respectively corresponding group manifolds, each said flow restrictor restricting the leakage flow through the corresponding output channel of the respective drive means.

13. A pressurized water reactor system as recited in claim 12, further comprising:

fourth valve means connected between said system manifold and said reservoir for selectively connecting said system manifold to said reservoir and bypassing said second valve means and said orifice.

14. A pressurized water reactor system as recited in claim 10, wherein:

the combined weight of each said drive rod and connected rod cluster associated with a given said drive means is sufficient to permit said drive rod and connected rod cluster to fall by force of gravity to said fully inserted position of said rod cluster, as the pressure differential within the associated said drive means reduces to pressure equilibrium therein;

each said drive means includes a stop for limiting the upward path of travel of the associated drive rod when moving to said fully withdrawn position of the associated rod cluster; and said mechanical engaging means of each said drive means includes means for mechanically engaging the upper end of the associated drive rod after said drive rod reaches said limiting stop and subsequently to pressure equilibrium being established therein, as said drive rod begins to fall by force of gravity, thereby to support same at the aforesaid, fully withdrawn position thereof.

15. A system as recited in claim 14, wherein:

each said first valve means, when selectively operated to connect the corresponding, selected said group manifold to said system manifold, in cooperation with the second valve means, when selectively operated to connect said group manifold to said reservoir, permits a leakage flow to pass through the output channels of the corresponding drive means of the selected group thereof and establish the aforesaid pressure differential in each thereof for producing a force to raise the upper end of said drive rods associated with said drive means of said corresponding group and thereby release same from said mechanical engaging means; and said further valve means, when selectively operated to connect said vent connection to said system manifold, functioning in cooperation with said second valve means, when selectively operated to disconnect said system manifold from said reservoir, to establish pressure equilibrium within each said corresponding drive means of said selected group and thereby permit the corresponding rod clusters thereof to drop by force of gravity to the fully inserted positions thereof.

16. A method of operating a pressurized water reactor system including a pressure vessel having provided therein, at successively higher elevations, a lower barrel assembly for receiving plural fuel rod assemblies therein in parallel axial relationship, an inner barrel assembly for receiving plural clusters of rods mounted in parallel axial relationship for selectively controlled, axial movement in telescoping relationship with the fuel rod assemblies between a fully inserted position within the lower barrel assembly and a fully withdrawn position within the inner barrel assembly, a plurality of drive rods respectively connected to said plurality of rod clusters and movable axially therewith through a path of travel corresponding to the movement of the respective rod clusters between the fully withdrawn and the fully inserted positions thereof, and a head assembly in sealed communication with the lower and inner barrel assemblies for containing the pressurized reactor coolant fluid within the vessel, a plurality of drive means being disposed in parallel axial relationship on and extending in seale relationship through the head assembly and in communication with the pressurized coolant fluid therein, each said drive means receiving therein, in sealed relationship, an upper end portion of a corresponding drive rod and permitting relative axial movement thereof through the path of travel, each said drive means having a leakage passage therein through which a leakage flow of the reactor coolant fluid may pass thereby to establish pressure equilibrium within said drive means producing substantially no net force acting on the associated drive rod and having an output channel through which the leakage flow of the reactor coolant fluid may pass to the exterior of said drive means to create a pressure differential therewithin establishing a net force acting on said drive rod to move same upwardly through said path of travel to the fully withdrawn position of the associated rod cluster, and mechanical engaging means selectively operable to engage an upper end portion of the drive rod and mechanically support same at the aforesaid fully withdrawn position thereof, a vent connection in communication with the pressurized reactor coolant fluid, and a reservoir maintained at substantially atmospheric pressure, the method of operation providing for selectively driving the rod clusters between the fully withdrawn and fully inserted positions, utilizing the reactant coolant fluid pressure, and comprising:
selectively connecting the corresponding output channels of selected said drive means to said reservoir to enable the leakage flow in said selected drive means to pass through the corresponding said output channel of each such selected drive means and establish a pressure differential therewithin, thereby to move the drive rod corresponding to each selected drive means upwardly through the path of travel to the fully withdrawn position of the associated rod cluster; and
selectively connecting the corresponding output channels of selected, said drive means to said vent connection to positively establish pressure equilibrium within each such selected drive means, the combined weight of each said drive rod and connected rod cluster associated with a given said drive means being sufficient to permit said drive rod and connected rod cluster, as the pressure differential within the associated said drive means reduces to pressure equilibrium therein, to fall by force of gravity to said fully inserted position of said rod cluster.

17. A method of operation of a pressurized water reactor system as recited in claim 16, wherein each said drive means of said system includes a stop for limiting the upward path of travel of the associated drive rod when moving to said fully withdrawn position of the associated rod cluster, and said mechanical engaging means of each said drive means includes means for mechanically engaging the upper end of the associated drive rod, after said drive rod reaches said limiting stop and as pressure equilibrium becomes established therein and said drive rod begins to fall by force of gravity, thereby to support same at the aforesaid, fully withdrawn position thereof, said method further comprising:
maintaining the selective connection of the corresponding output channels of selected said drive means to said reservoir until each associated drive rod engages the corresponding limit stop, and thereafter
disconnecting the corresponding output channels of the selected drive means from the reservoir and blocking passage of the leakage flow through the corresponding output channels thereby to establish pressure equilibrium within the selected drive means and cause each corresponding drive rod to fall by force of gravity and be mechanically engaged by the corresponding mechanical engaging means and supported thereby at the fully withdrawn position thereof.

18. A method of operation of a pressurized water reactor system including a pressure vessel having provided therein, at successively higher elevations, a lower barrel assembly for receiving plural fuel rod assemblies therein in parallel axial relationship, an inner barrel assembly for receiving plural clusters of rods mounted in parallel axial relationship for selectively controlled, axial movement in telescoping relationship with the fuel rod assemblies between a fully inserted position within the lower barrel assembly and a fully withdrawn position within the inner barrel assembly, a plurality of drive rods respectively connected to said plurality of rod clusters and movable axially therewith through a path of travel corresponding to the movement of the respective rod clusters between the fully withdrawn and the fully inserted positions thereof, and a head assembly in sealed communication with the lower and inner barrel assemblies for containing the pressurized reactor coolant fluid within the vessel, a plurality of drive means being disposed in parallel axial relationship on and extending in sealed relationship through the head assembly and in communication with the pressurized coolant fluid therein, each said drive means receiving therein, in sealed relationship, an upper end portion of a corresponding drive rod and permitting relative axial movement thereof through the path of travel, each said drive means having a leakage passage therein through which a leakage flow of the reactor coolant fluid may pass thereby to establish pressure equilibrium within said drive means producing substantially no net force acting on the associated drive rod and having an output channel through which the leakage flow of the reactor coolant fluid may pass to the exterior of said drive means to create a pressure differential therewithin establishing a net force acting on said drive rod to move same upwardly through said path of travel to the fully withdrawn position of the associated rod cluster, and mechanical engaging means selectively operable to engage an upper end portion of the drive rod and mechanically support same at the aforesaid fully withdrawn position thereof, a vent connection in communication with the pressurized reactor coolant fluid, and a reservoir maintained at substantially atmospheric pressure, the method of operation providing for selectively driving the rod clusters between the fully withdrawn and fully inserted positions, utilizing the reactant coolant fluid pressure, and comprising:

arranging the plurality of rod clusters and corresponding drive rods and drive means in a plurality of groups, each group comprising a predetermined number of rod clusters and respectively associated drive rods and drive means;

selecting a group of said associated drive means, drive rods and rod clusters for movement;

selectively connecting the corresponding output channels of the selected group of associated drive means to said reservoir to enable leakage flow to pass through the output channels of the corresponding drive means of the selected group and establish the aforesaid pressure differential in each thereof for moving the drive rods of the associated drive means of the selected group upwardly through the path of travel to the fully withdrawn positions of the associated rod clusters; and disconnecting the corresponding output channels of the associated drive means of the selected group from the reservoir and selectively connecting the corresponding output channels of the associated drive means of a selected group thereof to said vent connection to positively establish pressure equilibrium within each of the associated drive means of the selected group, the combined weight of each said drive rod and connected rod cluster associated with a given said drive means being sufficient to permit said drive rod and connected rod cluster, as the pressure differential within the associated said drive means reduces to pressure equilibrium therein, to fall by force of gravity to said fully inserted position of said rod cluster.

19. A method of operation of a pressurized water reactor system as recited in claim 18, further comprising:

restricting the rate of leakage flow from the associated drive means of the selected group so as to regulate the rate of change from pressure equilibrium to pressure differential within the said associated drive means of the selected group and thus the rate of movement of the corresponding drive rods to the withdrawn position of the associated rod clusters.

20. A method of operation of a pressurized water reactor system as recited in claim 18, wherein each said drive means of said system includes a stop for limiting the upward path of travel of the associated drive rod when moving to said fully withdrawn position of the associated rod cluster, and said mechanical engaging means of each said drive means includes means for mechanically engaging the upper end of the associated drive rod, after said drive rod reaches said limiting stop and as pressure equilibrium becomes established therein and said drive rod begins to fall by force of gravity, thereby to support same at the aforesaid, fully withdrawn position thereof, further comprising:

for each selected group of associated drive means for which the associated drive rods and rod clusters are to be moved into the fully inserted position, connecting the corresponding output channels of the associated drive means to said vent connection for a sufficient interval to raise the corresponding drive rods to the limiting stop of the respective drive means and thereby release same from mechanical engagement; and thereafter, selectively connecting the output channels of said associated drive means of the selected group to said vent connection to positively establish the pressure differential within the said associated drive means.

21. A method of operation of a pressurized water reactor system as recited in claim 20, further comprising:

for each said selected group of associated drive means for which a corresponding drive rod fails to move upwardly in sequence with the remainder of the drive rods of the group, bypassing the flow restriction in the connection of the output channels of the drive means of the associated group so as to produce an increased force in said drive means for driving the missequenced drive rod to the fully withdrawn position.

22. A method of operation of a pressurized water reactor system as recited in claim 20, further comprising:

for each selected group of associated drive means for which the corresponding drive rods are mechanically engaged in the fully withdrawn position of the associated rod clusters and which are to be moved to the fully inserted positions thereof, selectively and briefly connecting the corresponding output channels of the associated drive means of the selected group to said reservoir to establish a pressure differential therewithin for raising the mechanically engaged drive rods to the stops of the associated drive means, and then blocking the output channels of the associated drive means of the selected group so as to prevent further passage of the leakage flow through said output channels and establish pressure equilibrium within the associated drive means of the selected group, thereby to permit the corresponding drive rods and rod clusters to fall by force of gravity to the fully inserted positions.

23. A method of operation of a pressurized water reactor system as recited in claim 22, wherein, for any such selected group in which less than all of said associated drive rods are mechanically engaged in the fully withdrawn position by the corresponding, associated drive means of the selected group, selectively connecting the output channels of the associated drive means to said reservoir for a brief period of time sufficient to drive the mechanically engaged drive rods of the group upwardly and mechanically disengage same from the associated drive means thereof, said time being insufficient for driving any remaining drive rods of the group which are not mechanically latched to a fully withdrawn position;

selectively connecting the output channels of all of the associated drive means of the selected group to the vent connection to establish pressure equilibrium in all of the said associated drive means and maintaining said pressure equilibrium until all of the corresponding rod clusters have fallen to the fully inserted position; and selectively connecting the ouput channels of all of the associated drive means of the selected group to the reservoir to establish a pressure differential within each thereof, and maintaining same until all of the respectively corresponding rod clusters of the selected group have reached the fully withdrawn position.

24. A vent system for a pressurized water reactor system having a pressure vessel including a head assembly and plural hydraulic drive mechanisms disposed in parallel axial relationship on and extending in sealed relationship through the head assembly and in communication with the pressurized coolant fluid therein, each drive means receiving, in sealed relationship, an upper end portion of a corresponding drive rod and permitting relative axial movement thereof through a path of travel between a first, lower position and a second, upper position, and having a leakage passage therein through which a leakage flow of the reactor coolant fluid may pass thereby to establish pressure equilibrium within the drive means producing no net force acting on the associated drive rod, and further having an output channel through which the leakage flow of the reactor coolant fluid may pass to the exterior of the drive means to create a pressure differential therewithin establishing a net force acting on the drive rod to move same through the path of travel to the second position, comprising:

a system manifold;
plural first valve means connected to respectively corresponding drive means and selectively operable between open and closed positions;
a reservoir maintained at substantially atmospheric pressure;
second valve means selectively operable between open and closed positions;
an orifice;
a conduit connecting said second valve means and said orifice between said manifold and said reservoir;
operation of said second valve means and of a selected, said first valve means to the open positions of each thereof connecting the output channels of the drive means respectively corresponding to said first valve means through said common manifold and said orifice to said reservoir to establish a pressure differential within said respectively corresponding drive means for establishing a net force acting on the respectively corresponding drive rods to move same upwardly through the path of travel to the second, higher position thereof; and
actuation of any of said plurality of first valve means to said closed position blocking any leakage flow through the output channels of the corresponding drive means, thereby to establish pressure equilibrium therewithin.

25. A vent system as recited in claim 24, further comprising:
a vent connection extending through said head assembly and in communication with the pressurized reactor coolant fluid therewith;
further valve means, selectively operable between open and closed positions, connecting said vent connection to said common manifold; and
said further valve means, when operated to said open position, in combination with a selected one of said plurality of first valve means, when operated to said open position, connecting said vent connection through said common manifold to the outlet channels of said drive means corresponding to said selected first valve means, to positively establish pressure equilibrium within said respectively corresponding drive means.

26. A vent system as recited in claim 25, further comprising:
plural flow restricting means respectively connected between the output channels of said plural drive means and the respectively corresponding plurality of first valve means, for restricting the rate of leakage passing through the respective output channels of the respective, individual drive means.

27. A vent system as recited in claim 24, further comprising:
plural group manifolds respectively corresponding to and connected by said plurality of first valve means to said system manifold, and each said group manifold being connected to the output channels of a group of a predetermined number of associated said drive means;
each of said plurality of first valve means being operable in said open position thereof to connect the corresponding group of associated drive means through said corresponding group manifold to said common manifold.

28. A vent system as recited in claim 24, further comprising:
third valve means selectively operable between open and closed positions;
means connecting said third valve means between said common manifold and said reservoir; and
said third valve means, when selectively operated to said open position, connecting said common manifold to said reservoir, bypassing said orifice.

* * * * *